US008665294B2

(12) United States Patent
Hirooka

(10) Patent No.: US 8,665,294 B2
(45) Date of Patent: Mar. 4, 2014

(54) IMAGE LAYOUT DEVICE, IMAGE LAYOUT METHOD, AND STORAGE MEDIUM

(75) Inventor: Shigeki Hirooka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 280 days.

(21) Appl. No.: 12/768,631

(22) Filed: Apr. 27, 2010

(65) Prior Publication Data
US 2010/0289818 A1 Nov. 18, 2010

(30) Foreign Application Priority Data

May 12, 2009 (JP) ................................. 2009-115611

(51) Int. Cl.
*G09G 5/00* (2006.01)
*G06F 3/048* (2013.01)

(52) U.S. Cl.
USPC ............ 345/629; 345/619; 715/764; 715/811

(58) Field of Classification Search
USPC ................. 345/619, 629, 649–652, 654–656,
345/660–663, 665–667, 676; 715/761,
715/781–801, 757, 764–765, 810–813,
715/828–831, 835–839, 848–852; 358/537;
382/296, 298–300
See application file for complete search history.

(56) References Cited

U.S. PATENT DOCUMENTS

| | | | |
|---|---|---|---|
| 6,535,505 B1 * | 3/2003 | Hwang et al. .................. 370/352 |
| 6,574,616 B1 * | 6/2003 | Saghir ............................ 382/305 |
| 6,636,648 B2 * | 10/2003 | Loui et al. ...................... 382/284 |
| 7,148,990 B2 * | 12/2006 | Atkins et al. ................. 358/1.18 |
| 7,275,210 B2 * | 9/2007 | Girgensohn ................... 715/246 |
| 7,640,516 B2 * | 12/2009 | Atkins ........................... 715/853 |
| 7,788,258 B1 * | 8/2010 | Malpani et al. ................ 707/724 |
| 2002/0181786 A1 * | 12/2002 | Stark et al. ..................... 382/225 |
| 2003/0156304 A1 * | 8/2003 | Fedorovskaya et al. ...... 358/527 |
| 2004/0151399 A1 * | 8/2004 | Skurdal et al. ................ 382/266 |
| 2005/0168779 A1 * | 8/2005 | Tsue et al. .................... 358/1.18 |
| 2006/0200758 A1 * | 9/2006 | Atkins ........................... 715/517 |
| 2007/0186154 A1 * | 8/2007 | Anthony et al. .............. 715/517 |

(Continued)

FOREIGN PATENT DOCUMENTS

| | | |
|---|---|---|
| JP | 06-274580 A | 9/1994 |
| JP | 2004-234500 A | 8/2004 |
| JP | 2007-049387 A | 2/2007 |
| JP | 2008-030221 A | 2/2008 |

OTHER PUBLICATIONS

Machine Translation from Japansese to English for Japanese Patent Publication JP 2007-049387 issued to Yoshikawa et al.*

*Primary Examiner* — Aaron M Richer
*Assistant Examiner* — Michael J Cobb
(74) *Attorney, Agent, or Firm* — Carter, DeLuca, Farrell & Schmidt LLP

(57) ABSTRACT

An image layout device including an image alignment unit configured to align an image included in an image group based on an attribute of an image included in an image group, a layout selection unit configured to select a layout frame based on an order of a layout frame, which arranges an image, included in a template which is an arrangement object of an image and an attribute of the layout frame, an image selection unit configured to select an image based on an order of an image aligned by the image alignment unit and on the attribute of the image, and a selected image layout unit configured to arrange an image selected by the image selection unit in a layout frame selected by the layout frame selection unit.

13 Claims, 18 Drawing Sheets

(56) References Cited

U.S. PATENT DOCUMENTS

| | | |
|---|---|---|
| 2008/0012987 A1* | 1/2008 | Hirata et al. ............... 348/563 |
| 2008/0050039 A1* | 2/2008 | Jin ............................. 382/284 |
| 2008/0089590 A1* | 4/2008 | Isomura et al. ............. 382/217 |
| 2008/0094420 A1* | 4/2008 | Geigel et al. ............... 345/660 |
| 2008/0120496 A1* | 5/2008 | Bradford et al. ............ 712/239 |
| 2009/0116752 A1* | 5/2009 | Isomura et al. ............. 382/217 |
| 2009/0217203 A1* | 8/2009 | Aravamudan et al. ...... 715/811 |
| 2009/0282336 A1* | 11/2009 | Lindley et al. .............. 715/716 |
| 2010/0164992 A1* | 7/2010 | Akiya .......................... 345/641 |
| 2010/0274549 A1* | 10/2010 | Tal et al. ...................... 703/17 |
| 2010/0275152 A1* | 10/2010 | Atkins et al. ................ 715/788 |

* cited by examiner

IMAGE LAYOUT DEVICE, IMAGE LAYOUT METHOD, AND STORAGE MEDIUM

CROSS REFERENCE TO RELATED APPLICATIONS

This application claims priority from Japanese Patent Application No. 2009-115611 filed May 12, 2009, which is hereby incorporated by reference herein in its entirety.

BACKGROUND OF THE INVENTION

1. Field of the Invention

The present invention relates to an image layout device, an image layout method, a program, and a storage medium.

2. Description of the Related Art

In recent years, software and devices for arranging images and creating an album have been widely spread. In such software and devices, images are automatically arranged in a predetermined order (for example, an image shooting order) or manually designated and arranged by a user. Several techniques for more conveniently executing an image selection and layout while sufficiently satisfying a user's intent have been suggested.

As one of the above-mentioned techniques, an image editing device, which designates a feature of an image to be arranged in each image layout frame and automatically selects images based on some information, has been discussed in US Patent No. 2005/0168779. Further, an image layout device, which automatically computes an attention degree of an image and arranges images in a layout frame with a high priority in an attention degree order, has been discussed in Japanese Patent Application Laid-Open No. 2004-234500.

However, the conventional image layout devices have the following problems. First, when images are automatically arranged in a predetermined order, there is a problem in that an image to be arranged in the layout frame is determined regardless of the user's desire. Further, when the user manually selects an image, there is a problem in that much efforts and times are required in manually selecting an image to be applied to the layout frame from a large number of images and arranging the image.

Meanwhile, in techniques suggested for solving the problems, it is possible to automatically execute an image selection and layout in which the user's intent is reflected, but an image arrangement order does not necessarily coincide with an image shooting order. In this case, there is a problem in that in the case of an image group according to a certain flow, a layout, which does not satisfy the user's intent, is performed.

SUMMARY OF THE INVENTION

The present invention is directed to an image layout device and image layout method capable of automatically executing an image selection/layout in which an order of an image is maintained and a user's intent is reflected as much as possible.

According to an aspect of the present invention, an image layout device includes an image alignment unit configured to align an image included in an image group based on an attribute of an image included in an image group, a layout frame selection unit configured to select a layout frame based on an order of a layout frame in which an image is arranged, included in a template which is an arrangement object of an image, and on an attribute of the layout frame, an image selection unit configured to select an image based on an order of an image aligned by the image alignment unit, and on the attribute of the image, and a selected image layout unit configured to arrange an image selected by the image selection unit in a layout frame selected by the layout frame selection unit.

Due to such a configuration, it is possible to automatically perform the image selection/layout in which an order of an image is observed and the user's intent is reflected as much as possible. Further, the present invention may include an image layout method and a storage medium.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
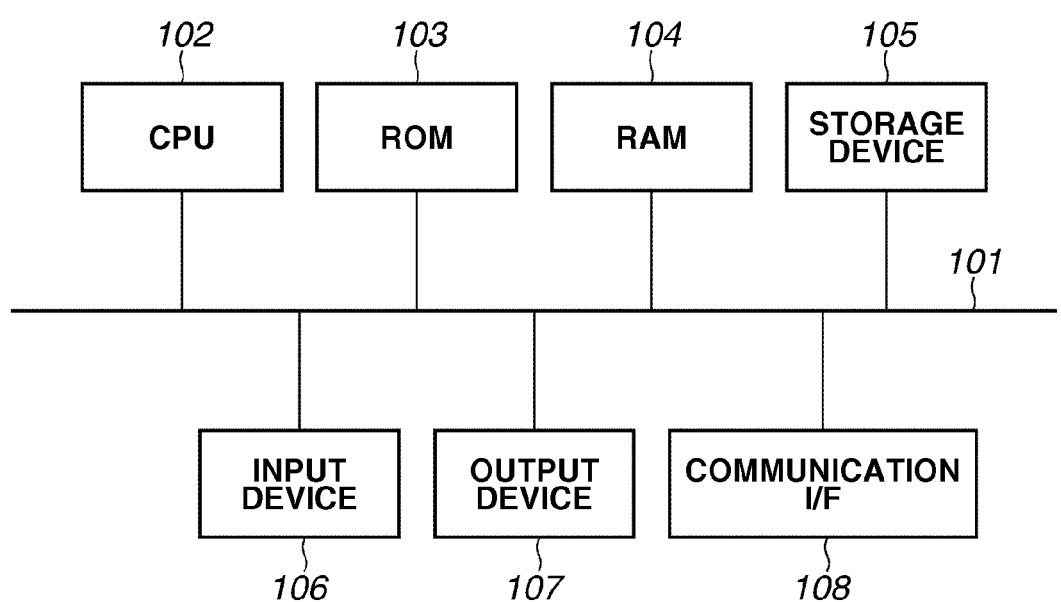
FIG. 1 is a block diagram illustrating an example of a hardware configuration of an image layout device as an example of an image layout device (a computer).

FIG. 1 is a block diagram illustrating an example of a hardware configuration of an image layout device as an example of an image layout device (a computer).

A central processing unit (CPU) 102 performs computation and logical determination for various pieces of processing and controls respective components connected to a bus 101. The image layout device is equipped with a memory, which includes a program memory and a data memory. The program memory stores programs of various pieces of processing, which will be described below by referring to a flowchart. The memory may include a read only memory (ROM) 103 or a random access memory (RAM) 104 into which a program is loaded from an external storage device.

A storage device 105 (e.g., a hard disk) stores data such as a template in which an image is arranged and a program. An input device 106 is used for inputting an instruction from a user. An output device 107 includes an output circuit such as a cathode ray tube (CRT), a liquid crystal display (LCD) device, and a speaker. A communication I/F 108 is an external interface for executing exchange of a command or data with an external device such as a memory card reading device and a printer, or a network.

As the CPU 102 executes processing based on a program, processing of software, which will be described below, and a flowchart, which will be described below, is implemented.

Figure 2:
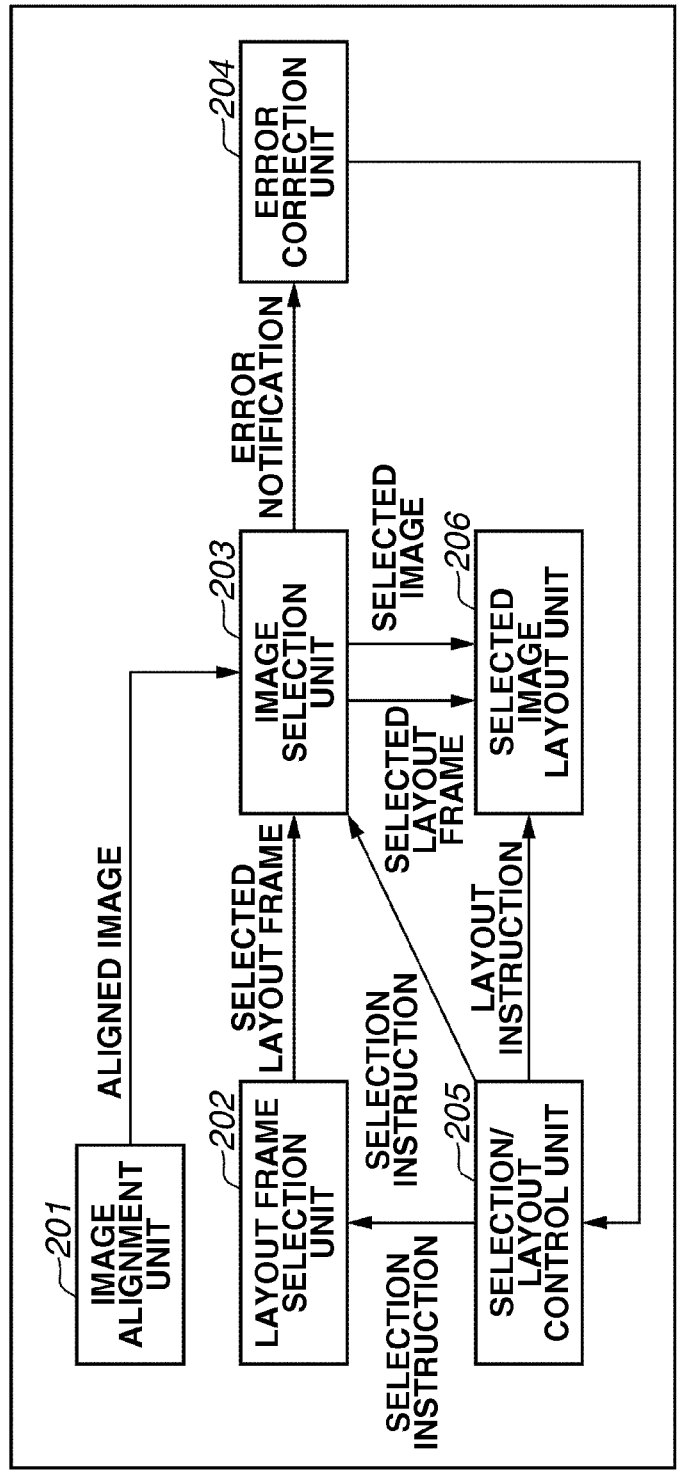
FIG. 2 is a block diagram illustrating an example of a software configuration of an image layout device.

FIG. 2 is a concept view illustrating an example of a software configuration of an image layout device. An image alignment unit 201 aligns images, which are included in a candidate image group to be arranged, provided by the user by based on a predetermined criterion (for example, a shooting date and time order) according to an attribute (an attribute value) attached to an image. A layout frame selection unit 202 selects a layout frame in which an image is not arranged yet from a template in which an image is arranged.

An image selection unit 203 selects an image appropriate to be arranged in the selected layout frame. An error correction unit 204 corrects an error when an image appropriate to be arranged in the selected layout frame is not present. When an image to be arranged is not present at the time of arranging an image, an error is sent from the image selection unit 203 to the error correction unit 204.

A selection/layout control unit 205 controls selection of the layout frame, selection of the image, and the layout of the selected image into the selected layout frame. A selected image layout unit 206 performs the layout of the selected image for the selected layout frame.

An image input from the memory card reading device through the communication I/F 108 by the user is aligned by the image alignment unit 201 and selected by the image selection unit 203. The selection/layout control unit 205 controls overall image layout processing for the layout frame by instructing the layout frame selection unit 202 and the image selection unit 203 to select images from appropriate ranges and instructing the selected image layout unit 206 to perform the layout.

Information for the layout frame selected by the layout selection unit 202 is transmitted to the image selection unit 203, and an image appropriate for an attribute of the layout frame is selected when selecting an image from the aligned image group. Information of the layout frame and the image, which are selected by the image selection unit 203, is transmitted to the selected image layout unit 206. The error correction unit 204 cancels immediately previous performed image selection and gives a reselection/layout instruction to the selection/layout control unit 205 to perform image selection processing secondly appropriate for the selected layout frame.

Figure 3:
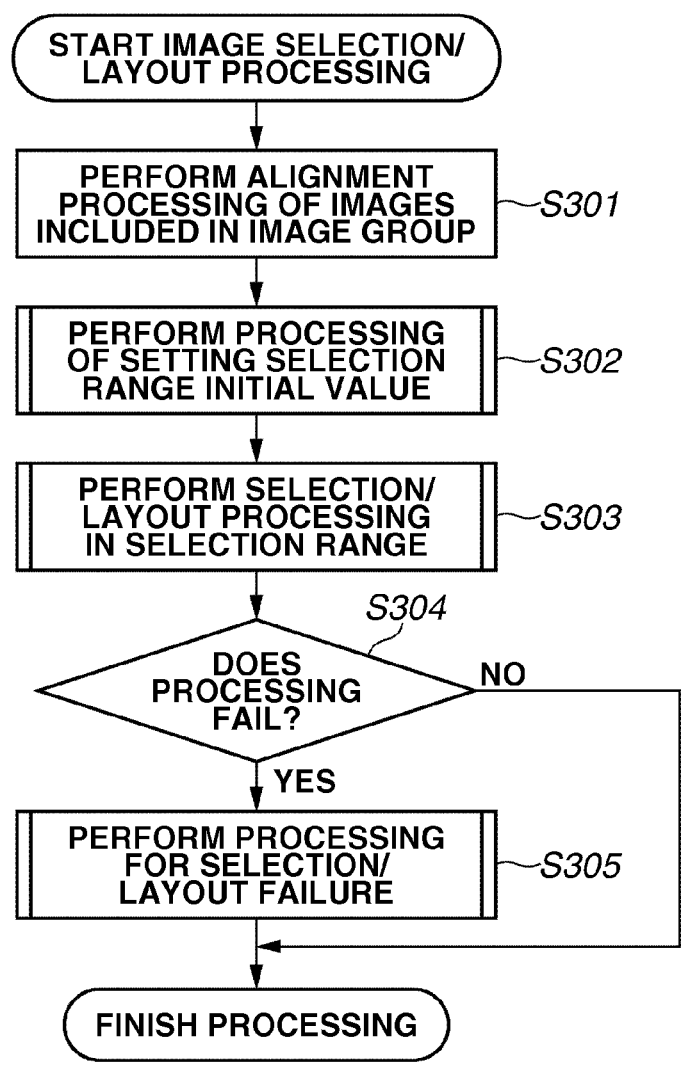
FIG. 3 is a flowchart illustrating an example of the flow of image selection/layout processing according to a first exemplary embodiment.

FIG. 3 is a flowchart illustrating an example of the flow of image selection/layout processing according to a first exemplary embodiment. For simplification of description, the following description is made assuming that processing is performed by the CPU 102. It is the same in other flowcharts.

First, in step S301, the CPU 102 aligns images, which are included in a candidate image group to be arranged, provided by the user based on a predetermined criterion (for example, a shooting date and time order) according to an attribute attached to an image. Next, in step S302, the CPU 102 performs selection range initial value setting processing. Detailed processing of step S302 is described referring to FIG. 4, which will be described below.

In step S303, the CPU 102 performs processing of arranging an image in a range set by the processing in a layout frame of a range set by the selection range initial value setting processing. Detailed processing of step S303 is described referring to FIG. 5, which will be described below. Thereafter, in step S304, the CPU 102 determines whether the image selection/layout processing has failed.

If the processing has failed (YES in step S304), the processing proceeds to step S305. In step S305, the CPU 102 performs processing for a failure of the selection/layout processing. If the processing has not failed (NO in step S304), the CPU 102 performs nothing and finishes the processing illustrated in FIG. 3. Detailed processing of step S305 is described referring to FIG. 10, which will be described below.

Figure 4:
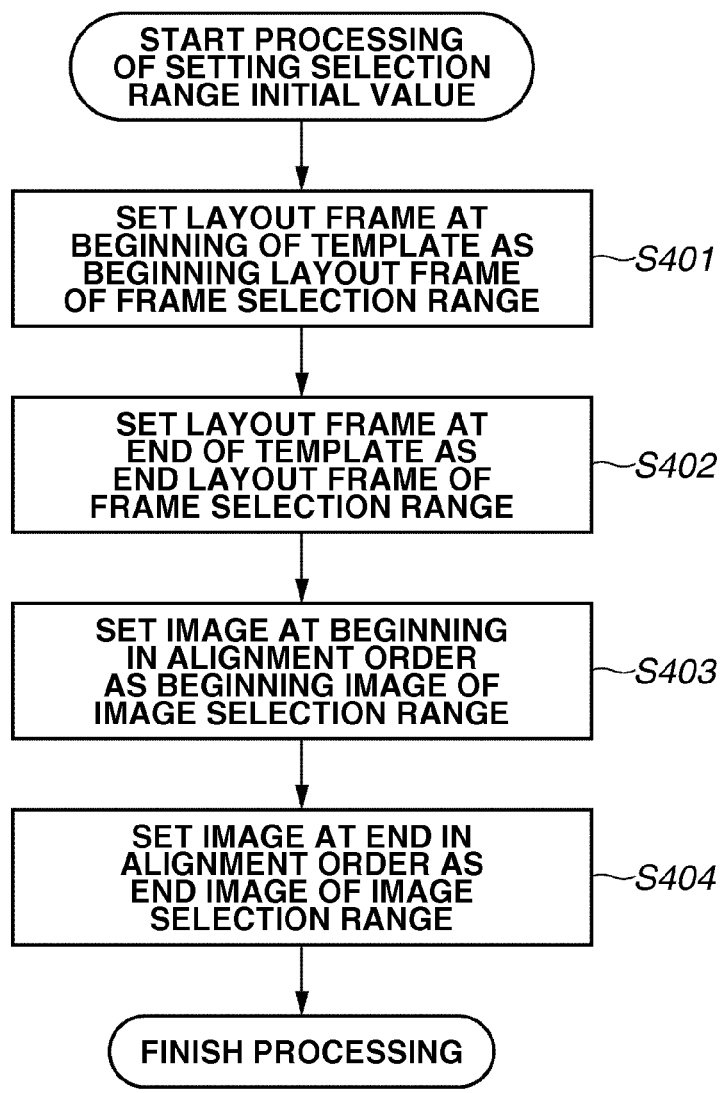
FIG. 4 is a flowchart illustrating an example of selection range initial value setting processing.

FIG. 4 is a flowchart illustrating an example of the selection range initial value setting processing. First, in step S401, the CPU 102 sets a layout frame of an image at a beginning of a template in which an image already selected by the user before performing the processing is to be arranged as a beginning of a frame selection range.

Next, in step S402, the CPU 102 sets a layout frame of an image at an end of a template as an end of the frame selection range. Thereafter, in step S403, the CPU 102 sets a beginning image of a candidate image group to be arranged, aligned in step S301 as a beginning of an image selection range. In step S404, the CPU 102 sets an end image of a candidate image group to be arranged as an end of the image selection range. Thereafter, the processing illustrated in FIG. 4 is finished.

Figure 5:
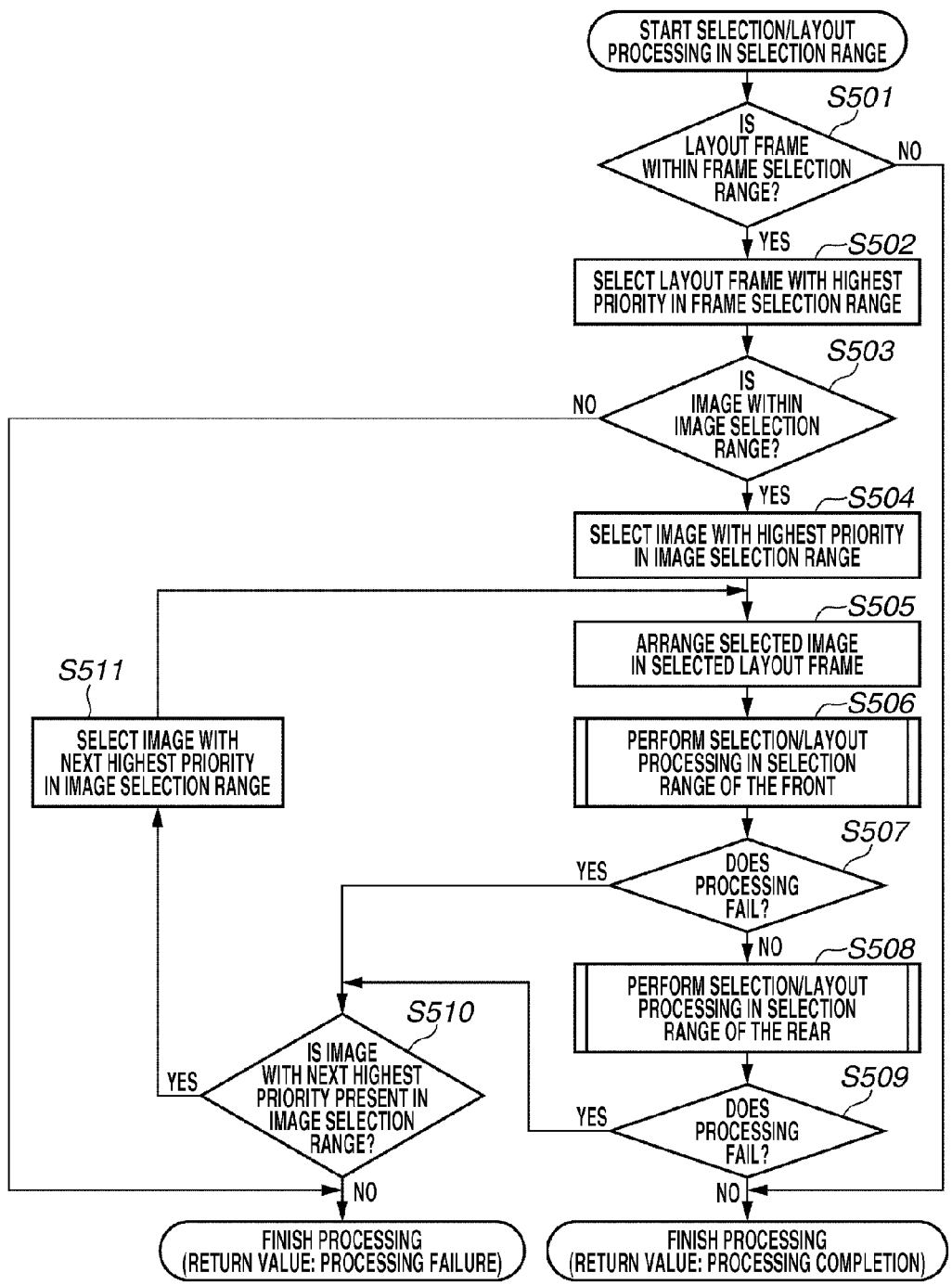
FIG. 5 is a flowchart illustrating an example of selection/layout processing for a selection range.

FIG. 5 is a flowchart illustrating an example of the selection/layout processing for the selection range. First, in step S501, the CPU 102 determines whether the number of the layout frames within the layout frame selection range is one or more. If the layout frame to be selected is not present within the selection range (NO in step S501), the CPU 102 sets a return value to processing completion and finishes the processing illustrated in FIG. 5.

If one or more layout frames to be selected are present within the selection range (YES in step S501), the processing proceeds to step S502. In step S502, the CPU 102 selects the layout frame with a highest priority in the layout frame selection range. Here, the priority is determined based on an attribute (for example, a frame size) of each layout frame.

Next, in step S503, the CPU 102 determines whether one or more images to be arranged in the selected layout frame are present within the selected image range (within the image selection range). If the image is present (YES in step S503), the processing proceeds to step S504. In step S504, the CPU 102 selects an image with a highest priority from the image range. In step S505, the CPU 102 arranges the image in the selected layout frame. Here, the priority is determined based on an attribute (for example, a preference degree) of each image.

Thereafter, in step S506, the CPU 102 performs image selection/layout processing for ranges (a layout frame group ahead of the layout frame and an image group ahead of the image) that are ahead of the layout frame selected in step S502 and the image selected in step S504. Detailed processing of step S506 is described referring to FIG. 6, which will be described below.

In step S507, the CPU 102 determines whether the processing of step S506 has failed. If the processing is normally completed (NO in step S507), the processing proceeds to step S508. In step S508, the CPU 102 performs image selection/layout processing for the ranges (a layout frame group behind the layout frame and an image group behind the image) behind the layout frame selected in step S502 and the image selected in step S504. Detailed processing of step S508 is described referring to FIG. 7, which will be described below.

In step S509, the CPU 102 determines whether the processing of step S508 has failed. If the processing is normally completed (NO in step S509), the return value of the processing result is set to normal complement of processing, and the processing illustrated in FIG. 5 is finished. If the image to be arranged in the selected layout frame is not present within the selected image range (NO in step S503), the return value of the processing result is set to a processing failure, and the processing illustrated in FIG. 5 is finished.

If it is determined in step S507 or step S509 that the image selection/layout processing for the selection range has failed, the processing proceeds to step S510. In step S510, the CPU 102 determines whether an image with a priority highest next to the currently selected image is present.

If the image with the next highest priority is present (YES in step S510), in step 511, the CPU 102 selects the image and returns to the processing of step S505. However, if the image with the next highest priority is not present (NO in step S510), the return value of the processing result is set to a processing failure, and the processing illustrated in FIG. 5 is finished.

Figure 6:
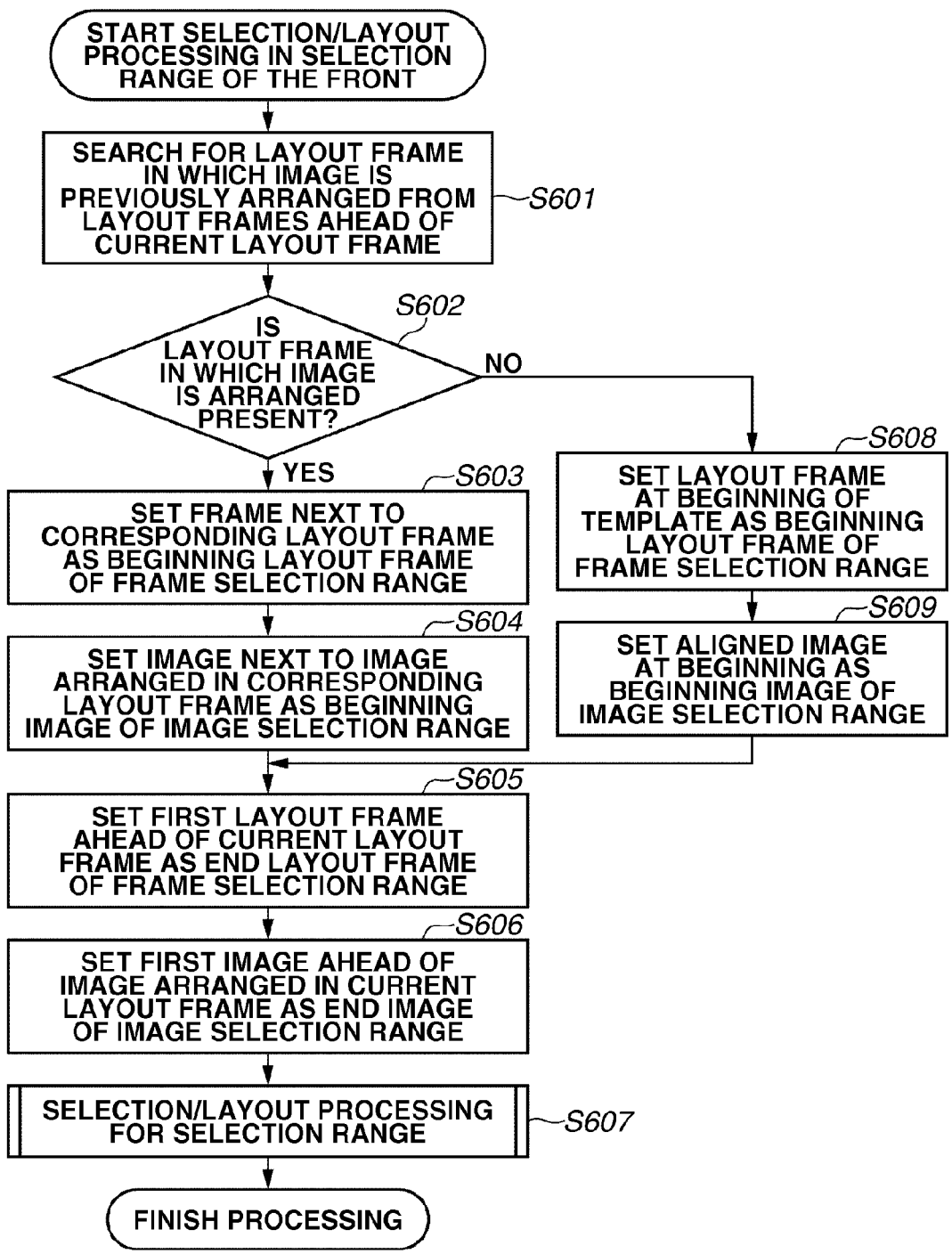
FIG. 6 is a flowchart illustrating an example of processing of performing an image selection/layout after setting a layout frame and an image ahead of a layout frame in which an image is selected and arranged and an image as a new range according to the first exemplary embodiment.

FIG. 6 is a flowchart illustrating an example of processing of performing an image selection/layout after setting a layout frame and an image ahead of a layout frame in which an image is selected and arranged and an image as a new range according to the first exemplary embodiment.

First, in step S601, the CPU 102 searches for a layout frame in which an image is already arranged, in sequence, for layout frames ahead of a current layout frame in which an image is selected and arranged. Next, in step S602, the CPU 102 determines whether the layout frame in which the image is already arranged is present.

If the layout frame in which the image is already arranged is present (YES in step S602), the processing proceeds to step S603. In step S603, the CPU 102 sets a layout frame next to the layout frame as a beginning layout frame of a new layout frame range. In step S604, the CPU 102 sets an image next to the image arranged in the layout frame in an image alignment order as a beginning image of a new image range.

If the layout frame in which the image is already arranged is not present (NO in step S602), the processing proceeds to step S608. In step S608, the CPU 102 sets a layout frame at the beginning of the template as a beginning layout frame of the new layout frame range. In step S609, the CPU 102 sets an image at the beginning in the image alignment order as a beginning image of the new image range.

In step S605, the CPU 102 sets the first layout frame ahead of the current layout frame in which an image is selected and arranged as an end layout frame of the new layout frame. Subsequently, in step S606, the CPU 102 sets a first image ahead of an image arranged in the current layout frame in the image alignment order as an end image of the new image range. Thereafter, in step S607, the CPU 102 performs image selection/layout processing for the selection ranges illustrated in FIG. 5 and then finishes the processing illustrated in FIG. 6.

Figure 7:
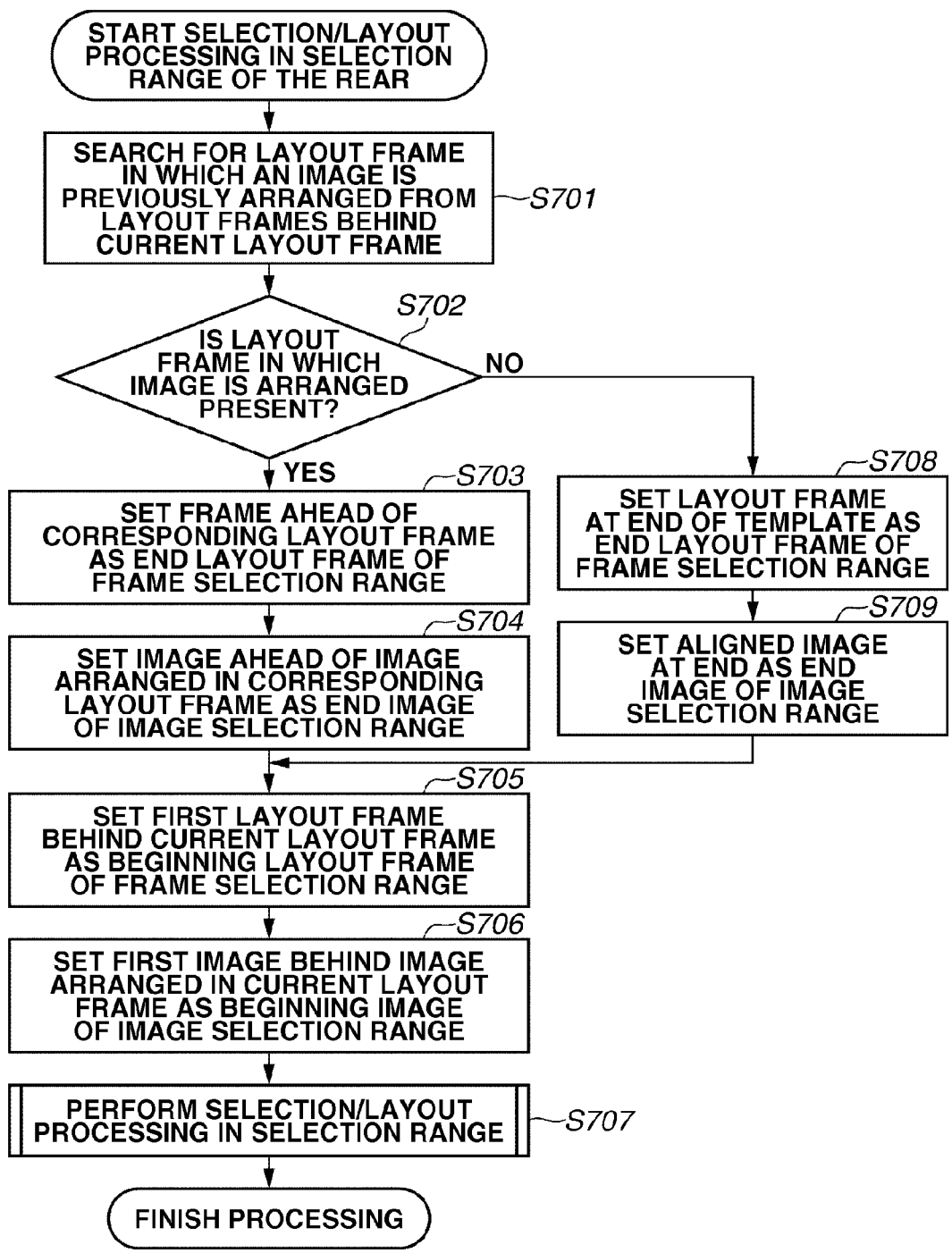
FIG. 7 is a flowchart illustrating an example of processing of performing an image selection/layout after setting a layout frame in which an image is selected and arranged and an behind the image as a new range according to the first exemplary embodiment.

FIG. 7 is a flowchart illustrating an example of processing of performing an image selection/layout after setting a layout frame in which an image is selected and arranged and behind the image as a new range according to the first exemplary embodiment.

First, in step S701, the CPU 102 searches for a layout frame in which an image is already arranged, in sequence, from the frame behind the current layout frame in which an image is selected and arranged. Next, in step S702, the CPU 102 determines whether the layout frame in which the image is already arranged is present.

If the layout frame in which the image is already arranged is present (YES in step S702), the processing proceeds to step S703. In step S703, the CPU 102 sets a layout frame ahead of the layout frame as an end layout frame of a new layout frame range. In step S704, the CPU 102 sets an image ahead of the image arranged in the layout frame in the image alignment order as an end image of a new image range.

If the layout frame in which the image is already arranged is not present (NO in step S702), the processing proceeds to step S708. In step S708, the CPU 102 sets a layout frame at the end of the template as an end layout frame of the new layout frame range. In step S709, the CPU 102 sets an image at the end in the image alignment order as an end image of the new image range.

In step S705, the CPU 102 sets a first layout frame behind the current layout frame in which an image is selected and arranged as a beginning layout frame of the new layout frame. In step S706, the CPU 102 sets the first image behind the image arranged in the current layout frame in the image alignment order as an end image of the new image range. Thereafter, in step S707, the CPU 102 performs image selection/layout processing for the selection ranges illustrated in FIG. 5 and then finishes the processing illustrated in FIG. 7.

Figure 8:
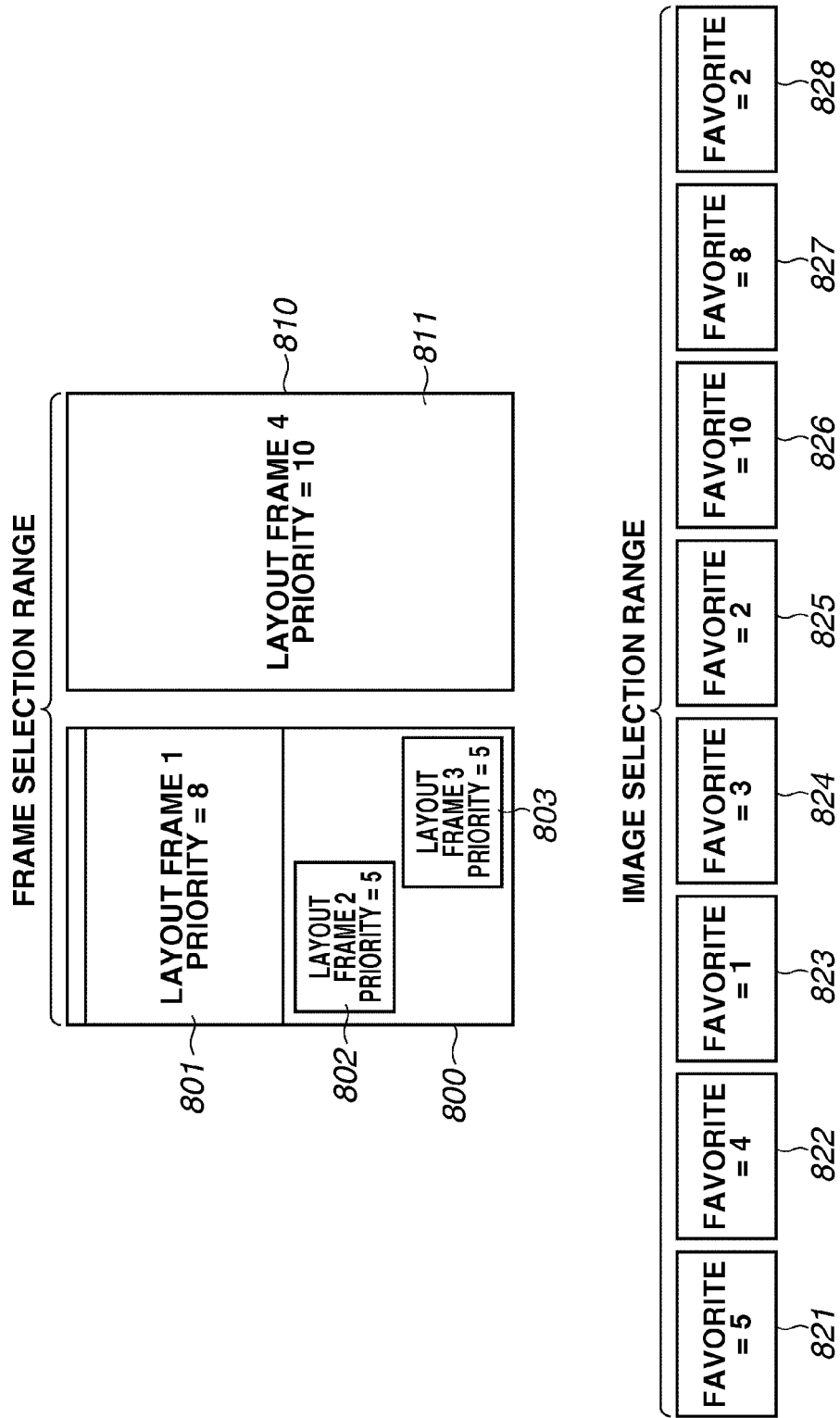
FIG. 8 illustrates an example of image selection/layout processing for a selection range when there is no failure in image selection/layout at all.

FIG. 8 illustrates an example of image selection/layout processing for the selection range when there is no failure in the image selection/layout at all.

In FIG. 8, pages 800 and 810 are pages in a template in which images are to be arranged. Layout frames 801 to 803 and 811 are frames in respective pages. It is assumed that a currently selected layout frame range includes layout frames 801, 802, 803, and 811, and an order of the layout frames (an order of the layout) is also the above order.

In the present exemplary embodiment illustrated in FIG. 8, a priority of each layout frame is determined based on a frame size, and the larger the number is, the higher the priority is.

Here, it is assumed that images 821 to 828 are a candidate image group to be arranged, which is included in the currently selected range and are arranged in an order of images 821 to 828. As illustrated in FIG. 8, a preference degree determined by the user is set to each image.

In the present exemplary embodiment, an image with a higher preference degree is selected and arranged in a layout frame with a higher priority. In other words, in the present exemplary embodiment, the CPU 102 treats an image with a higher preference degree as an image with a higher priority.

The CPU 102 performs the image selection/layout processing for the selection range illustrated in FIG. 5 for the layout frame range and the image range, which are selected as described above. As a result, the layout frame 811 with the highest priority among the layout frames 801, 802, 803, and 811 is selected in step S502.

Next, in step S504, the CPU 102 selects the image 826 with the highest preference degree among the images 821 to 828 and, in step S505, arranges the image 826 in the layout frame 811. Next, the CPU 102 sets the layout frames 801 to 803 ahead of the layout frame 811 as a new frame selection range and sets the images 821 to 825 ahead of the image 826 as a new image selection range in step S506.

The CPU 102 recursively calls out the image selection/layout processing for the new selection ranges. First, in step S502, the CPU 102 selects the layout frame 801 with the highest priority among the layout frames 801, 802, and 803. In step S505, the CPU 102 selects the image 821 with the highest preference degree among the images 821 to 825 in step S504 and arranges the image 821 in the layout frame 801.

Thereafter, the CPU 102 performs nothing and normally finishes the processing of step S506 since the layout frame ahead of the layout frame 801 is not present.

In step S508, the CPU 102 sets the layout frames 802 and 803 behind the layout frame 801 as a new frame selection range and the images 822 to 825 behind the image 821 as a new image selection range. The CPU 102 recursively calls out the image selection/layout processing for the new selection ranges.

First, in step S502, the CPU 102 selects the layout frame 802 with the highest priority among the layout frames 802 and 803 (a layout frame which is ahead has a higher priority in the case of the same value). In step S504, the CPU 102 selects the image 822 with the highest preference degree among the images 822 to 825 and, in step S505, arranges the image 822 in the layout frame 802. Thereafter, the CPU 102 performs nothing and normally finishes the processing of step S506 since an empty layout frame ahead of the layout frame 802 is not present.

In step S508, the CPU 102 sets the layout frame 803 behind the layout frame 802 as a new frame selection range and the images 823 to 825 behind the image 822 as a new image selection range. The CPU 102 recursively calls out the image selection/layout processing for the new selection ranges.

First, in step S502, the CPU 102 selects the layout frame 803, and, in step S504, selects the image 824 with the highest preference degree among the images 823 to 825. In step S505, the CPU 102 arranges the image 824 in the layout frame 803.

Accordingly, through the above-described processing, the image 821 is arranged in the layout frame 801, the image 822 is arranged in the layout frame 802, the image 824 is arranged in the layout frame 803, and the image 826 is arranged in the layout frame 811.

Figure 9:
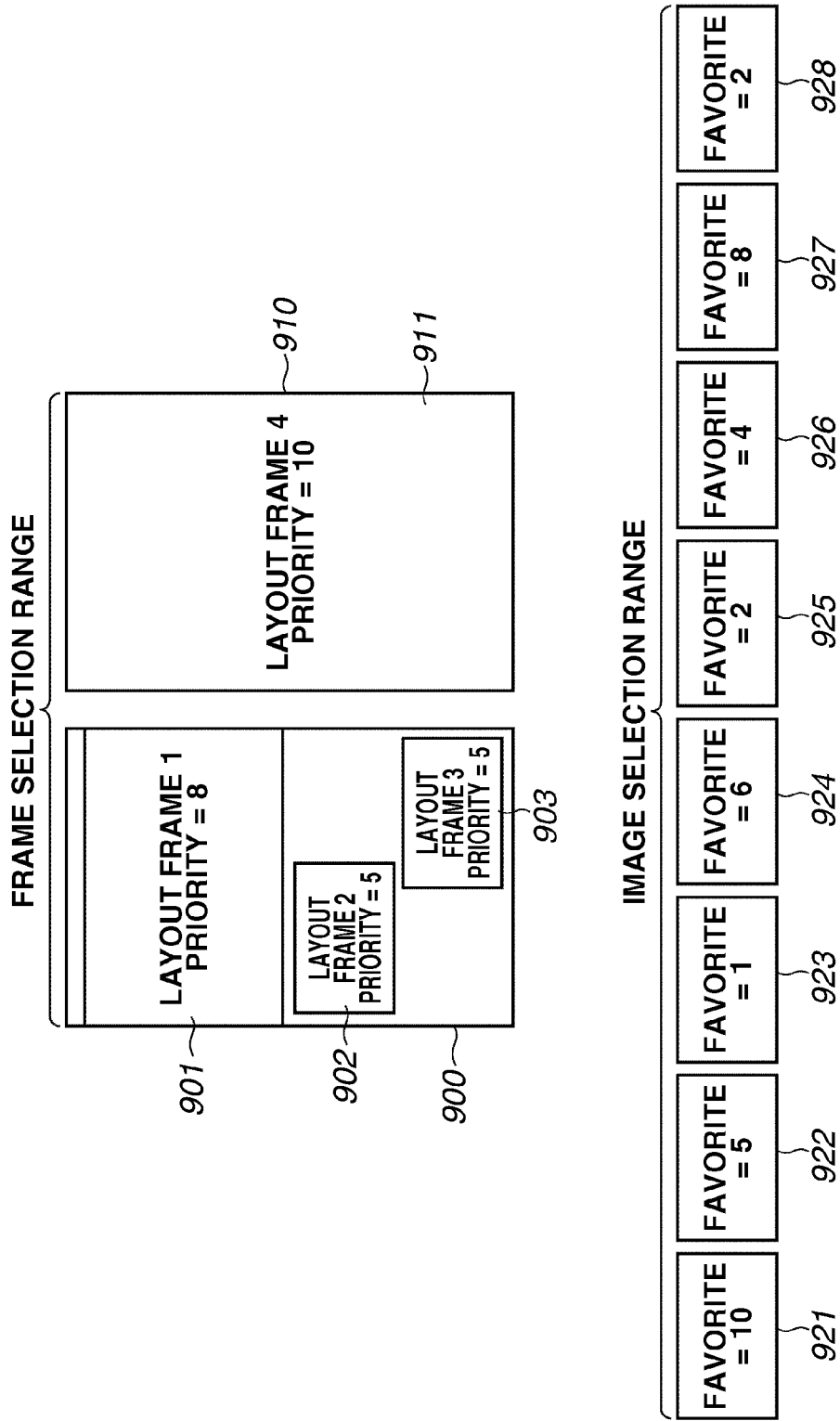
FIG. 9 illustrates an example of image selection/layout processing for a selection range when there is a failure during an image selection/layout.

FIG. 9 illustrates an example of image selection/layout processing for the selection range when there is a failure during the image selection/layout.

In FIG. 9, pages 900 and 910 are pages in a template in which images are to be arranged. Layout frames 901 to 903 and 911 are layout frames arranged in respective pages. It is assumed that a currently selected layout frame range includes layout frames 901, 902, 903, and 911, and an order of the layout frames (an order of the layout) is also this order. In the present exemplary embodiment illustrated in FIG. 9, a priority of each layout frame is determined based on a frame size, and the larger the number is, the higher the priority is.

It is assumed that images 921 to 928 are a candidate image group to be arranged, which is included in the currently selected range and are arranged in an order of pages 921 to 928. As illustrated in FIG. 9, a preference degree set by the user is set to each image. In the present exemplary embodiment, an image with a higher preference degree is selected and arranged in a layout frame with a higher priority.

The CPU 102 performs the image selection/layout processing for the selection range illustrated in FIG. 5 from the layout frame range and the image range, which are selected as described above. As a result, in step S502, the layout frame 911 with the highest priority among the layout frames 901, 902, 903, and 911 is selected.

Next, in step S504, the CPU 102 selects the image 921 with the highest preference degree among the images 921 to 928, and, in step S505, arranges the image 921 in the layout frame 911. Next, in step S506, the CPU 102 sets the layout frames 901 to 903 ahead of the layout frame 911 as a new frame selection range and sets an empty image selection range since an image ahead of the image 921 is not present. The CPU 102 recursively calls out the image selection/layout processing for the new selection range.

First, in step S502, the CPU 102 selects the layout frame 901 with the highest priority among the layout frames 901, 902, and 903. In step S503, the CPU 102 returns to processing of a calling source due to a processing failure since the image is not present in the image range (NO in step S503). Since it is determined in step S507 that the processing result of the calling source has failed, the CPU 102 determines whether an image with a preference degree highest next to the image 921 is present in step S510.

In step S511, the CPU 102 selects the image 927. Thereafter, in step S505, the CPU 102 arranges the image 927 in the already selected layout frame 911. Next, in step S506, the CPU 102 sets the layout frames 901 to 903 ahead of the layout frame 911 as a new frame selection range and the images 921 to 926 ahead of the image 927 as a new image selection range.

The CPU 102 recursively calls out the image selection/layout processing for the new selection ranges. First, in step S502, the CPU 102 selects the layout frame 901 with the highest priority among the layout frames 901, 902, and 903. In step S504, the CPU 102 selects the image 921 with the highest preference degree among the images 921 to 926 and, in step S505, arranges the image 921 in the layout frame 901.

Thereafter, since a layout frame ahead of the layout frame 901 is not present, in step S509, the CPU 102 sets the layout frames 902 and 903 behind the layout frame 901 as a new frame selection range and the images 922 to 926 behind the image 921 as a new image selection range. Next, in step S507, the CPU 102 recursively calls out the image selection/layout processing for the selection range illustrated in FIG. 5. First, in step S502, the CPU 102 selects the layout frame 902 with the highest priority among the layout frames 902 and 903 (a layout frame which is ahead has a higher priority in the case of the same value).

In step S504, the CPU 102 selects the image 924 with the highest preference degree among the images 922 to 926 and, in step S505, arranges the image 924 in the layout frame 902.

Thereafter, since an empty layout frame ahead of the layout frame 902 is not present, the CPU 102 performs nothing and finishes the processing of step S506.

The CPU 102 sets the layout frame 903 behind the layout frame 902 as a new frame selection range and the images 925 and 926 behind the image 924 as a new image selection range and recursively calls out the image selection/layout processing for the new selection ranges in step S508.

First, in step S502, the CPU 102 selects the layout frame 903 and, in step S504, selects the image 926 with a higher preference degree among the images 925 and 926 and, in step S505, arranges the image 926 in the layout frame 903. Accordingly, through the above-described processing, the image 921 is arranged in the layout frame 901, the image 924 is arranged in the layout frame 902, the image 926 is arranged in the layout frame 903, and the image 927 is arranged in the layout frame 911.

Figure 10:
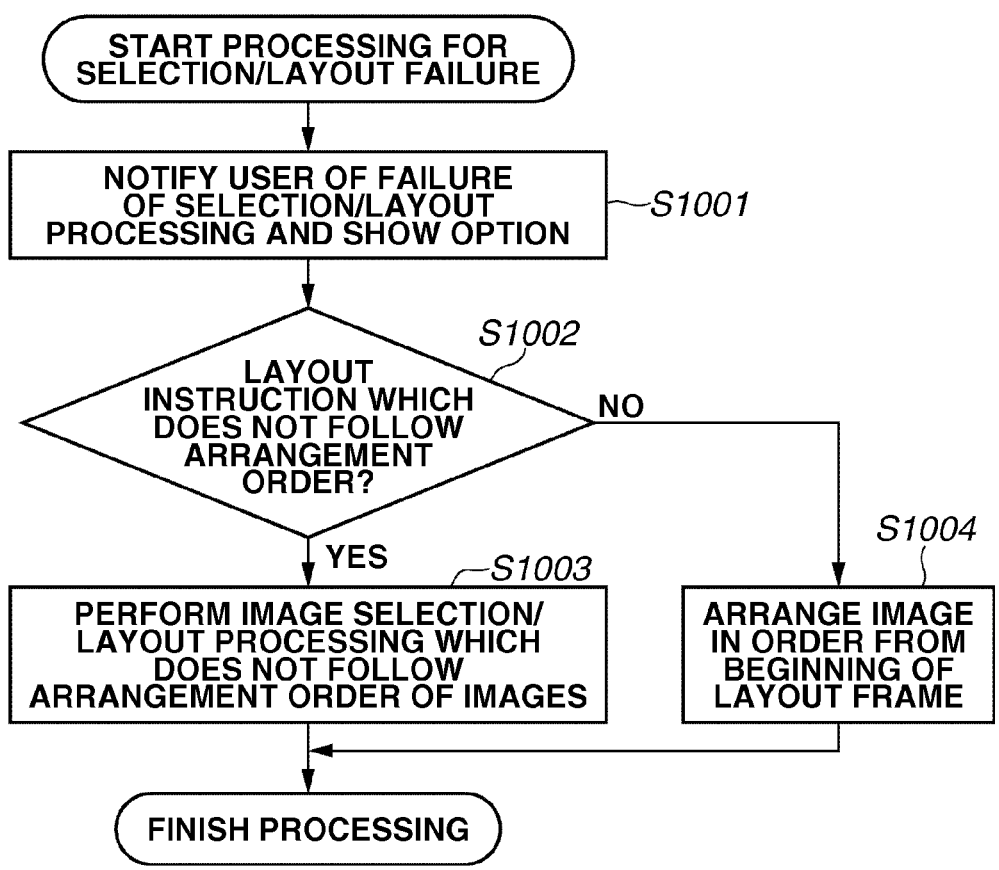
FIG. 10 is a flowchart illustrating an example of processing when an image selection/layout fails.

FIG. 10 is a flowchart illustrating an example of processing when the image selection/layout has failed. First, in step S1001, the CPU 102 notifies (shows) the user of a failure of the image selection/layout processing. At this time, the CPU 102 presents, to the user, an option that the user can select about whether an instruction is to automatically arrange images even if an image arrangement order is changed.

Next, in step S1002, the CPU 102 receives an instruction (or a selection of the option) from the user and determines whether the instruction is to automatically arrange images even if an image arrangement order is changed. If the instruction is to automatically arrange images even if an image arrangement order is changed (YES in step S1002), the processing proceeds to step S1003. In step S1003, the CPU 102 performs layout processing based on a correspondence relationship between an attribute of a layout frame of an image and an attribute of an image for all images regardless of the image arrangement order, and then finishes the processing illustrated in FIG. 10.

However, if the instruction is an instruction for maintaining the image arrangement order (NO in step S1002), the processing proceeds to step S1004. In step S1004, the CPU 102 arranges as many images as the number of the layout frames in order starting from the beginning of the layout frame, and then finishes the processing illustrated in FIG. 10.

In the present exemplary embodiment, the CPU 102 determines the priority of the layout frame based on the size of the layout frame, but the priority may be adjusted based on a position in the template. For example, a layout frame at the beginning position of the template may have a higher priority. Further, the CPU 102 may adjust the priority based on a shape of the layout frame. For example, a layout frame having a shape other than a typical rectangular shape such as a star shape or a heart shape may have a higher priority. Further, the CPU 102 may determine the priority based on the decoration of the layout frame.

In the present exemplary embodiment, the CPU 102 aligns the images in the shooting date and time order, but may align the images in an image file name order, an imaging device order, or a subject order. The CPU 102 may align the images in a month and date order in which a year is not considered, a season order, or a subject age order.

In the present exemplary embodiment, the CPU 102 uses a preference degree which is an attribute of an image as a priority of an image, but may use a quality of an image, a resolution, a focused degree, an exposure value, a subject, a size of a subject, or a smiling face degree of a subject as a priority of an image.

As described above, in the image layout device according to the present exemplary embodiment, it is possible to arrange an image with a high preference degree in a layout frame with a high priority while observing the image arrangement order.

In the present exemplary embodiment, an exemplary embodiment in which the CPU 102 performs processing of switching whether to perform the image selection/layout according to an order of an image based on an attribute of an image is described with reference to the drawings. In the present exemplary embodiment, points different from the above-described exemplary embodiment are mainly described.

Figure 11:
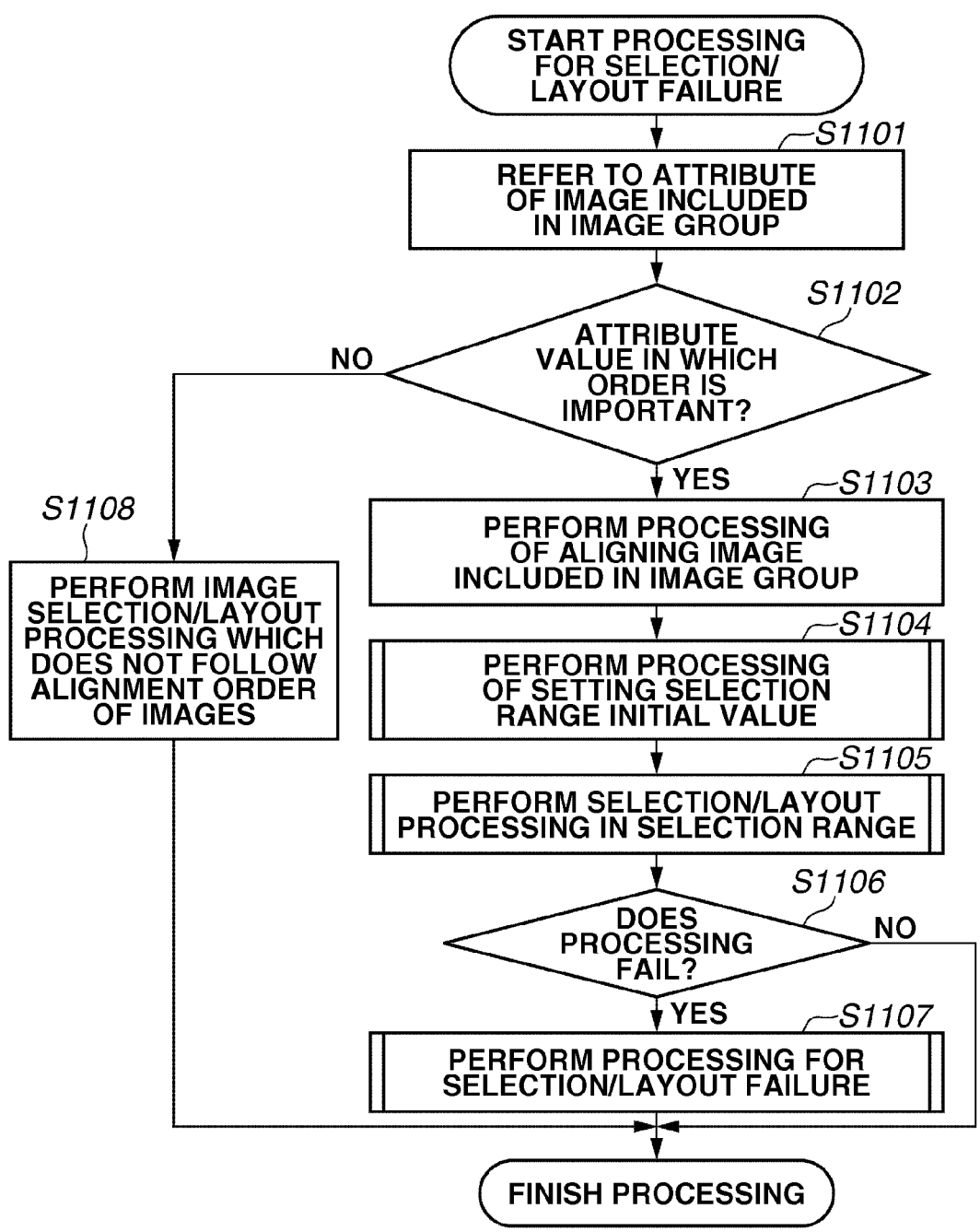
FIG. 11 is a flowchart illustrating an example of the flow of image selection/layout processing according to a second exemplary embodiment.

FIG. 11 is a flowchart illustrating an example of the flow of image selection/layout processing according to a second exemplary embodiment.

First, in steps S1101 and S1102, the CPU 102 refers to an attribute (for example, a genre of an image) of an image included in an image group and determines whether an image has an attribute in which an order is important. If an image has an attribute in which an order is important (for example, an image is a wedding picture) (YES in step S1102), the processing proceeds to step S1103. In step S1103, the CPU 102 aligns images, which are included in a candidate image group to be arranged, provided by the user based on a predetermined criterion (for example, a shooting date and time order) according to an attribute attached to an image.

Next, in step S1104, the CPU 102 performs selection range initial value setting processing. In step S1105, the CPU 102 performs processing of arranging an image of a range set by the processing in a layout frame of a range set by the selection range initial value setting processing. Thereafter, in step S1106, the CPU 102 determines whether the image selection/layout processing has failed.

If the processing has failed (YES in step S1106), the processing proceeds to step S1107. In step S1107, the CPU 102 performs processing for a failure of the selection/layout processing. If the processing has not failed (NO in step S1106), the CPU 102 performs nothing and finishes the processing.

If an image shooting order does not have an important attribute (NO in step S1102), the processing proceeds to step S1108. In step S1108, the CPU 102 performs layout processing based on a correspondence relationship between an attribute of a layout frame of an image and an attribute of an image regardless of an image arrangement order, and then finishes processing illustrated in FIG. 11.

An image of which the image shooting order does not have an important attribute represents images in which an image shooting order is not important such as a landscape picture, a picture of a flower, or an animal, but an appearance, beauty, or an image quality of a subject is important.

As described above, in the image layout device according to the present exemplary embodiment, it is possible to switch whether to perform the image selection/layout according to an order of an image based on an attribute of an image.

In the present exemplary embodiment, an exemplary embodiment in which the CPU 102 performs processing of switching whether to perform the image selection/layout according to an order of an image based on an attribute of a template is described with reference to the drawings. In the present exemplary embodiment, points different from the above-described exemplary embodiment are mainly described.

Figure 12:
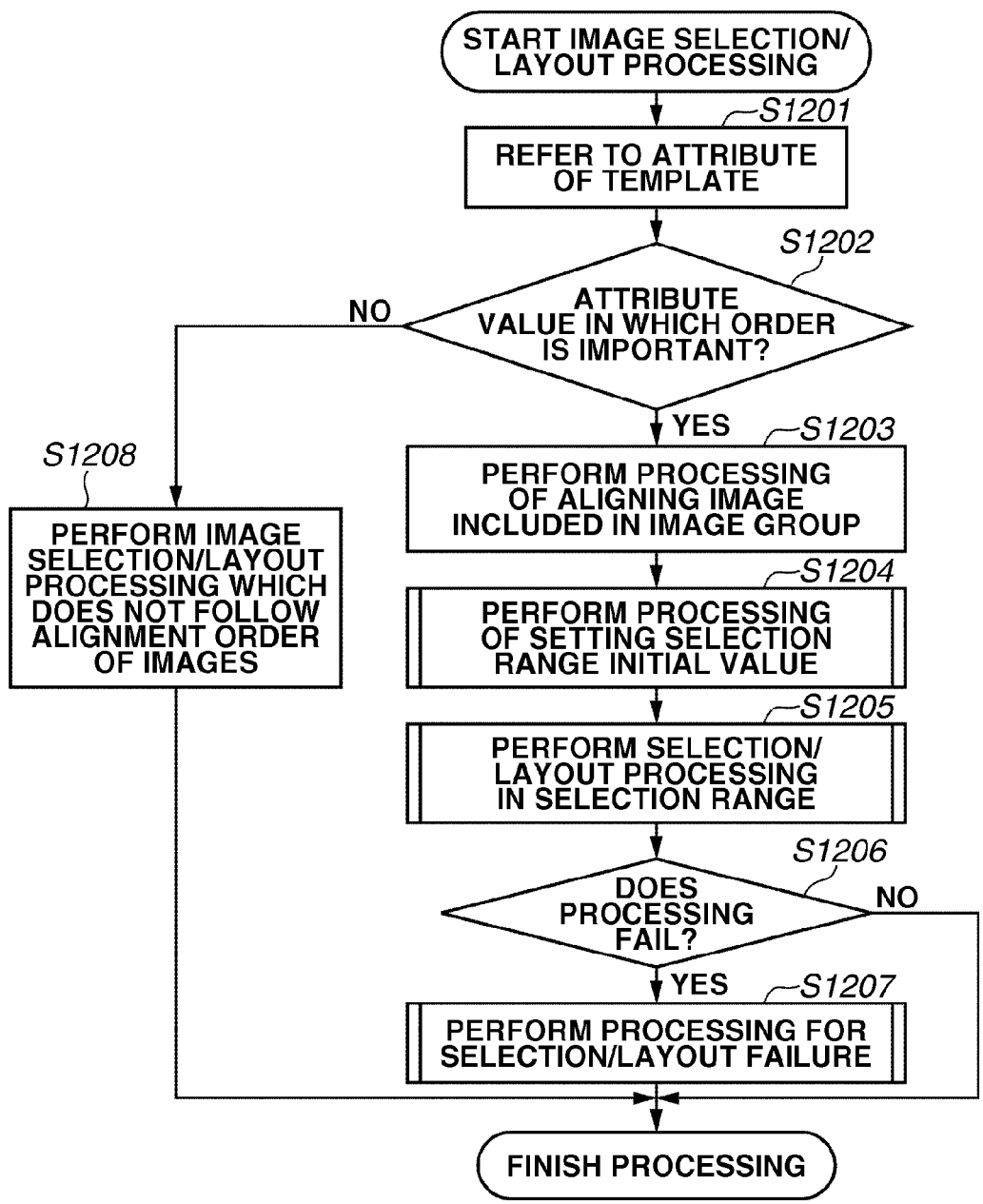
FIG. 12 is a flowchart illustrating an example of the flow of image selection/layout processing according to a third exemplary embodiment.

FIG. 12 is a flowchart illustrating an example of the flow of image selection/layout processing according to a third exemplary embodiment.

First, in steps S1201 and S1202, the CPU 102 refers to an attribute (for example, a genre of a template) of a template in which an image is arranged, and determines whether a template has an attribute in which an order is important. If the template has an attribute in which an order is important (for example, the template has an attribute of a child growth record) (YES in step S1202), the processing proceeds to step S1203. On the other hand, if the template does not have an attribute in which an order is important (NO in step S1202), the processing proceeds to step S1208.

In step S1203, the CPU 102 aligns images, which are included in a candidate image group to be arranged, provided by the user based on a predetermined criterion (for example, a shooting date and time order) according to attribute information attached to an image. Next, in step S1204, the CPU 102 performs selection range initial value setting processing. In step S1205, the CPU 102 performs processing of arranging an image of a range set by the processing in a layout frame of a range set by the selection range initial value setting processing.

Thereafter, in step S1206, the CPU 102 determines whether the image selection/layout processing has failed. If the processing has failed (YES in step S1206), the processing proceeds to step S1207. In step S1207, the CPU 102 performs processing for a failure of the selection/layout processing. On the other hand, if the processing has not failed (NO in step S1206), the CPU 102 performs nothing and finishes the processing illustrated in FIG. 12.

In step S1208, the CPU 102 performs layout processing based on a correspondence relationship between an attribute of a layout frame of an image and an attribute of an image regardless of an image arrangement order. Thereafter, the CPU 102 finishes processing illustrated in FIG. 12.

In the present exemplary embodiment, an attribute in which an order is important includes a record of a travel or a race, an event such as a wedding ceremony, a building record of a structure as well as a child growth record.

As described above, in the image layout device according to the present exemplary embodiment, it is possible to switch whether to perform the image selection/layout according to an order of images based on an attribute of a template in which an image is arranged.

In the present exemplary embodiment, an exemplary embodiment in which the CPU 102 excludes a certain layout frame from an object to be arranged in order is described with reference to the drawings. In the present exemplary embodiment, points different from the above-described exemplary embodiment are mainly described.

Figure 13:
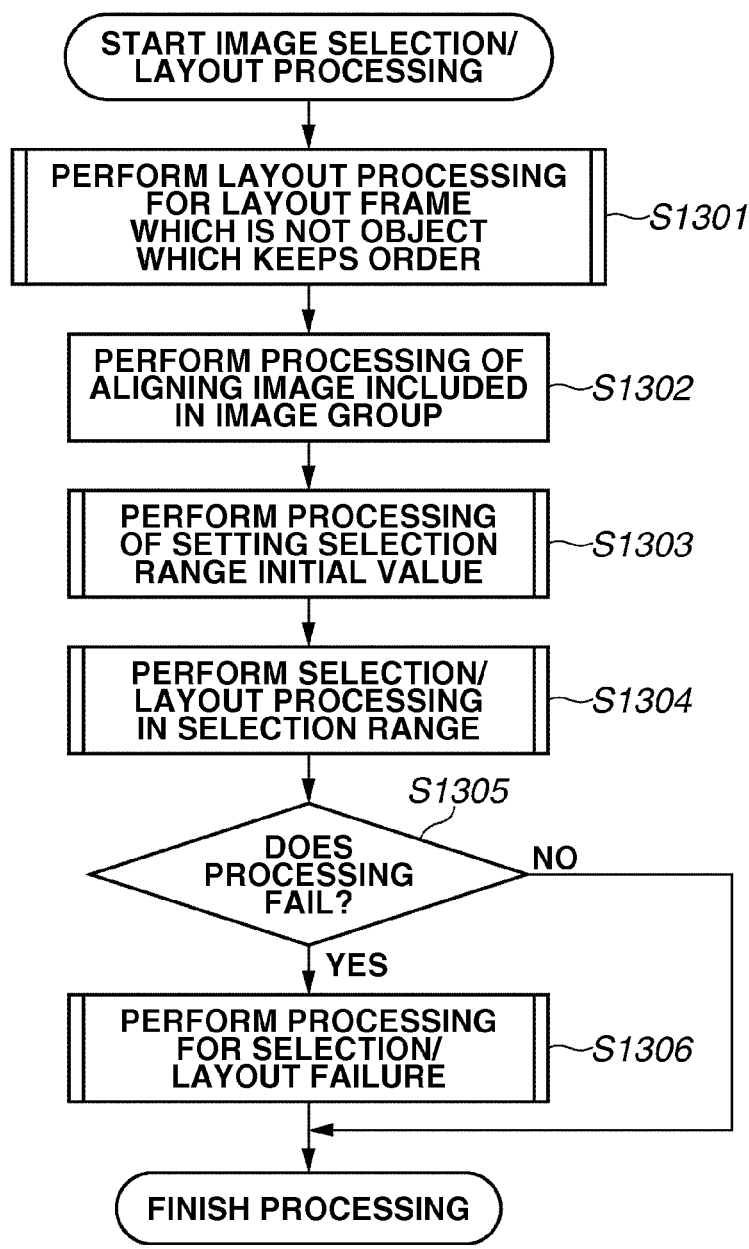
FIG. 13 is a flowchart illustrating an example of the flow of image selection/layout processing according to a fourth exemplary embodiment.

FIG. 13 is a flowchart illustrating an example of the flow of image selection/layout processing according to a fourth exemplary embodiment.

First, in step S1301, the CPU 102 selects a layout frame which is not an object to be arranged in order based on an attribute of a layout frame, and performs the image layout processing for the selected layout frame. Detailed processing of step S1301 is described referring to FIG. 14. In step S1302, the CPU 102 aligns images, which are included in a candidate image group to be arranged, provided by the user based on a predetermined criterion (for example, a shooting date and time order) according to an attribute attached to an image. Next, in step S1303, the CPU 102 performs selection range initial value setting processing.

In step S1304, the CPU 102 performs processing of arranging an image in a range set by the processing in a layout frame in a range set by the selection range initial value setting processing. Thereafter, in step S1305, the CPU 102 determines whether the image selection/layout processing has failed. If the processing has failed (YES in step S1305), the processing proceeds to step S1306. In step S1306, the CPU 102 performs processing for a failure of the selection/layout processing. On the other hand, if the processing has not failed (NO in step S1305), the CPU 102 performs nothing and finishes the processing illustrated in FIG. 13.

Figure 14:
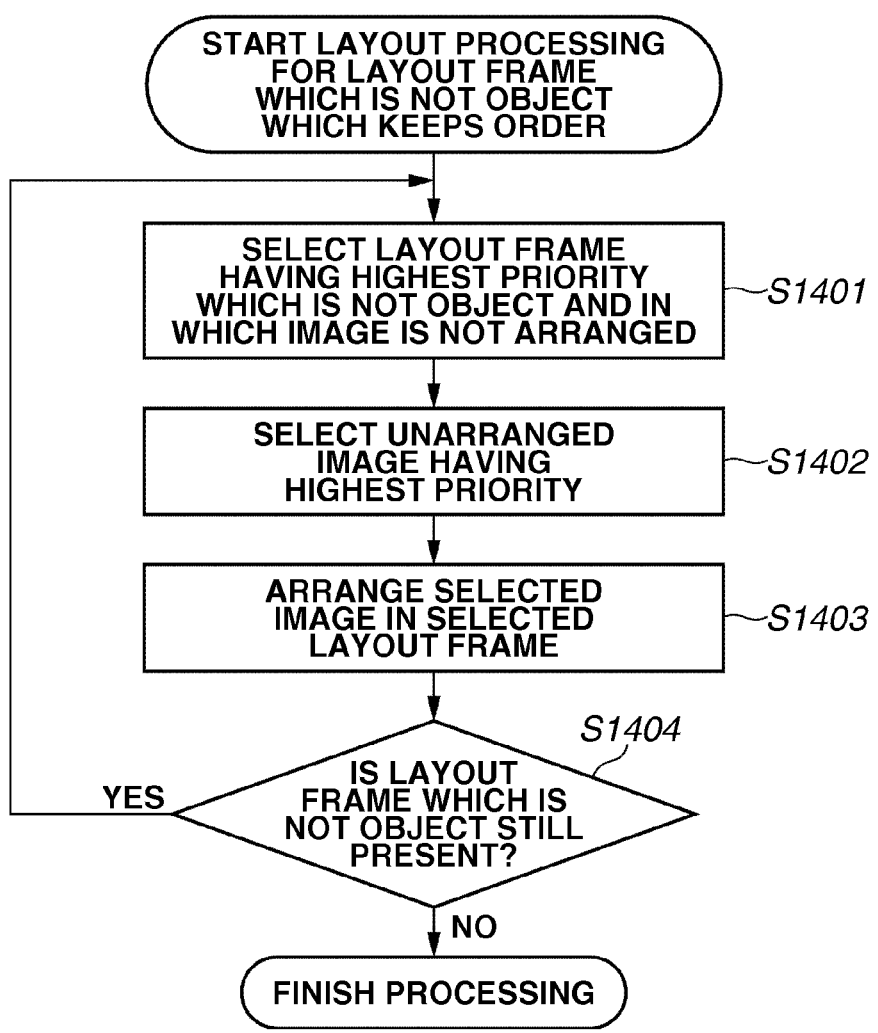
FIG. 14 is a flowchart illustrating an example of layout processing for a layout frame that is not an object to be arranged in order.

FIG. 14 is a flowchart illustrating an example of layout processing for a layout frame, which is not an object to be arranged in order.

First, in step S1401, the CPU 102 selects a layout frame having a highest priority from among the layout frames which are not an object to be arranged in order and in which an image is not arranged yet. Here, the layout frame, which is not an object to be arranged in order, represents layout frames in which an order is not important and it is important to arrange in a large layout frame such as a group picture in a wedding ceremony album or a travel album.

Next, in step S1402, the CPU 102 selects an image having a highest priority from among the images, which are included in a candidate image group to be arranged, provided by the user and are not arranged in the layout frame yet. In step S1403, the CPU 102 arranges the selected image in the selected layout frame.

In step S1404, the CPU 102 determines whether among layout frames, which are not an object to be arranged in order, there is a layout frame in which an image is not arranged yet. If there is a layout frame in which an image is not arranged yet (YES in step S1404), the processing returns to step S1401. On the other hand, if there is no layout frame in which an image is not arranged yet (NO in step S1404), the processing illustrated in FIG. 14 is finished.

In the present exemplary embodiment, in the processing of determining the layout frame selection range in the selection/layout processing for the selection range of the front illustrated in FIG. 6, the CPU 102 excludes the layout frame, which is not an object to be arranged in order, and determines the layout frame selection range. The selection processing for the selection range of the rear illustrated in FIG. 7 is similar.

Further, in the layout frame selection processing in the selection/layout processing for the selection range of FIG. 5, the CPU 102 excludes the layout frame which is not an object to be arranged in order and performs the selection processing.

In the present exemplary embodiment, the CPU 102 automatically arranges an image in a layout frame, which is not an object to be arranged in order according to a correspondence between an attribute of a layout frame and an attribute of an image, but an image may be manually arranged by the user.

As described above, in the image layout device according to the present exemplary embodiment, it is possible to exclude a certain layout frame from an object to be arranged in order, and then arrange an image with a high preference degree in a layout frame with a high priority in an image arrangement order for the other layout frames.

In the present exemplary embodiment, an exemplary embodiment in which the CPU 102 performs the image selection/layout in which an order is observed when layout frames lies over a plurality of pages, and a coincidence of an attribute is considered more important than the order when layout frames are within the same page is described with reference to the drawings. In the present exemplary embodiment, points different from the above-described exemplary embodiment are mainly described.

Figure 15:
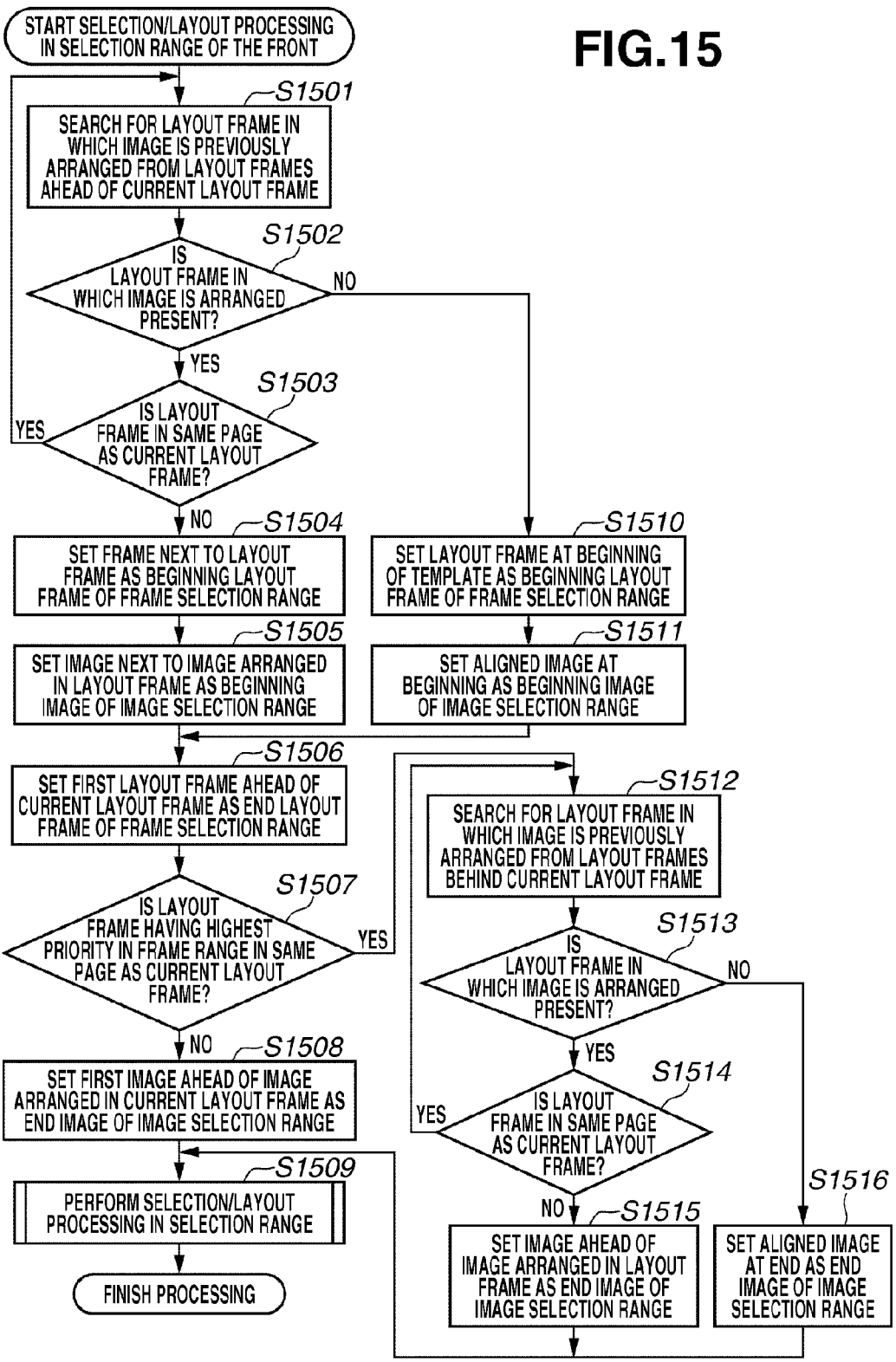
FIG. 15 is a flowchart illustrating an example of processing of performing an image selection/layout after setting a layout frame and an image ahead of a layout frame in which an image is selected and arranged and an image as a new range according to a fifth exemplary embodiment.

FIG. 15 is a flowchart illustrating an example of processing of performing the image selection/layout after setting layout frames and images ahead of a layout frame in which an image is selected and arranged and an image as a new range according to a fifth exemplary embodiment.

First, in step S1501, the CPU 102 searches for a layout frame in which an image is already arranged, in sequence, from layout frames ahead of a current layout frame for which an image is selected and arranged. Next, in step S1502, the CPU 102 determines whether the layout frame in which the image is already arranged is present. If the layout frame in which the image is already arranged is present (YES in step S1502), the processing proceeds to step S1503. In step S1503, the CPU 102 determines whether the layout frame is in the same page as the current layout frame.

If the layout frame is in the same page as the current layout frame (YES in step S1503), the processing returns to step S1501. On the other hand, if the layout frame is in a different page, the processing proceeds to step S1504. In step S1504, the CPU 102 sets a layout frame next to the layout frame as a beginning layout frame of a new layout frame range. In step S1505, the CPU 102 sets an image next to the image arranged in the layout frame in an image alignment order as a beginning image of a new image range.

If the layout frame in which the image is already arranged is not present (NO in step S1502), the processing proceeds to step S1510. In step S1510, the CPU 102 sets a layout frame at the beginning of the template as a beginning layout frame of a new layout frame range. In step S1511, the CPU 102 sets an image at the beginning in the image alignment order as a beginning image of a new image range.

In step S1506, the CPU 102 sets a first layout frame ahead of the current layout frame in which an image is selected and arranged as an end layout of the new layout frame range. Thereafter, in step S1507, the CPU 102 determines whether a layout frame that has a highest priority in the newly set layout frame range is present in the same page as the current layout frame.

If a layout frame that has a highest priority in the new layout frame range is not present in the same page as the current layout frame (NO in step S1507), the processing proceeds to step S1508. In step S1508, the CPU 102 sets a first image ahead of the image arranged in the current layout frame in the image alignment order as an end image of the new image range. Thereafter, in step S1509, the CPU 102 performs the image selection/layout processing for the selection range and then finishes the processing illustrated in FIG. 15.

If a layout frame that has a highest priority in the new layout frame range is present in the same page as the current layout frame (YES in step S1507), the processing proceeds to step S1512. In step S1512, the CPU 102 searches for a layout frame in which an image is already arranged, in sequence, from layout frames behind the current layout frame. In step S1513, the CPU 102 determines whether a layout frame in which an image is already arranged is present.

If a layout frame in which an image is already arranged is present (YES in step S1513), the processing proceeds to step S1514. In step S1514, the CPU 102 determines whether the layout frame is in the same page as the current layout frame. If the layout frame is in the same page as the current layout frame (YES in step S1514), the processing returns to step S1512. On the other hand, if the layout frame is in a different page (NO in step S1514), the processing proceeds to step S1515. In step S1515, the CPU 102 sets a first image ahead of the image arranged in the layout frame as an end image of the new image range and proceeds to step S1509.

If the layout frame in which the image is already arranged is not present (NO in step S1513), the processing proceeds to step S1516. In step S1516, the CPU 102 sets an image at the end in the image alignment order as an end image of the new image range, and then proceeds to step S1509.

Figure 16:
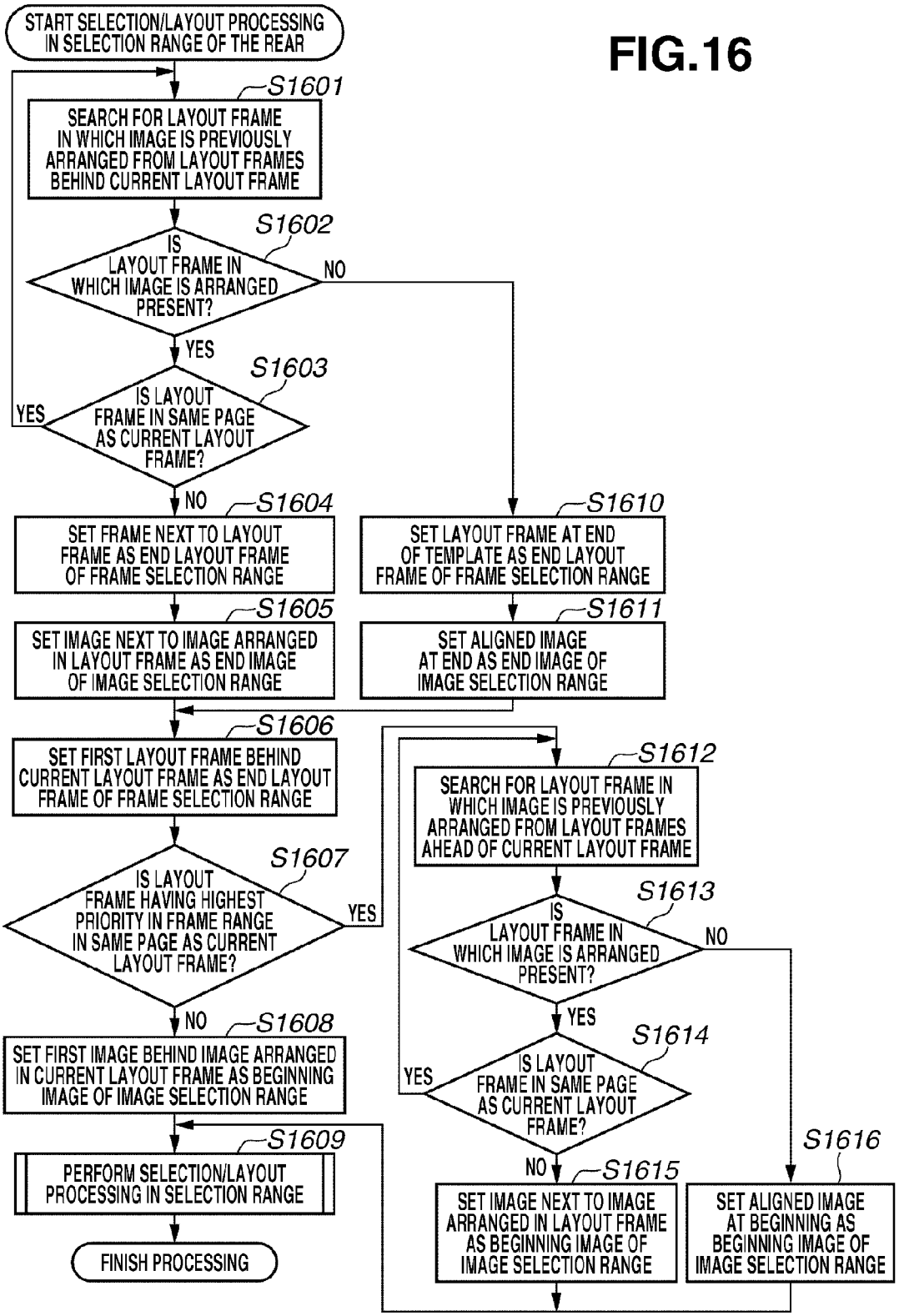
FIG. 16 is a flowchart illustrating an example of processing of performing an image selection/layout after setting a layout frame in which an image is selected and arranged and behind of the image as a new range according to the fifth exemplary embodiment.

FIG. 16 is a flowchart illustrating an example of processing of performing the image selection/layout after setting layout frames and images behind a layout frame in which an image is selected and arranged and an image as a new range according to the fifth exemplary embodiment.

First, in step S1601, the CPU 102 searches for a layout frame in which an image is already arranged, in sequence, from layout frames behind a current layout frame for which an image is selected and arranged. Next, in step S1602, the CPU 102 determines whether the layout frame in which the image is already arranged is present. If the layout frame in which the image is already arranged is present (YES in step S1602), the processing proceeds to step S1603. In step S1603, the CPU 102 determines whether the layout frame is in the same page as the current layout frame.

If the layout frame is in the same page as the current layout frame (YES in step S1603), the processing returns to step S1601. On the other hand, if the layout frame is in a different page (NO in step S1603), the processing proceeds to step S1604. In step S1604, the CPU 102 sets a layout frame ahead of the layout frame as an end layout frame of a new layout frame range. In step S1605, the CPU 102 sets an image ahead of the image arranged in the layout frame in an image alignment order as a beginning image of a new image range.

If the layout frame in which the image is already arranged is not present (NO in step S1602), the processing proceeds to step S1610. In step S1610, the CPU 102 sets a layout frame at the end of the template as an end layout frame of the new layout frame range. In step S1611, the CPU 102 sets an image at the end in the image alignment order as an end image of the new image range.

In step S1606, the CPU 102 sets the first layout frame behind the current layout frame in which an image is selected and arranged as a beginning layout frame of the new layout frame range. Thereafter, in step S1607, the CPU 102 determines whether a layout frame that has a highest priority in the newly set layout frame range is present in the same page as the current layout frame.

If a layout frame that has a highest priority in the new layout frame range is not present in the same page as the current layout frame (NO in step S1607), the processing proceeds to step S1608. In step S1608, the CPU 102 sets the first image behind the image arranged in the current layout frame in the image alignment order as a beginning image of the new image range. Thereafter, in step S1609, the CPU 102 performs the image selection/layout processing for the selection range and then finishes the processing illustrated in FIG. 16.

If a layout frame that has a highest priority in the new layout frame range is present in the same page as the current layout frame (YES in step S1607), the processing proceeds to step S1612. In step S1612, the CPU 102 searches for a layout frame in which an image is already arranged, in sequence, from layout frames ahead of the current layout frame. In step S1613, the CPU 102 determines whether a layout frame in which an image is already arranged is present.

If a layout frame in which an image is already arranged is present (YES in step S1613), the processing proceeds to step S1614. In step S1614, the CPU 102 determines whether the layout frame is in the same page as the current layout frame.

If the layout frame is in the same page as the current layout frame (YES in step S1614), the processing returns to step S1612. On the other hand, if the layout frame is in a different page (NO in step S1614), the processing proceeds to step S1615. In step S1615, the CPU 102 sets an image next to the image arranged in the layout frame as a beginning image of the new image range. Then, the processing proceeds to step S1609.

If the layout frame in which the image is already arranged is not present (NO in step S1613), the processing proceeds to step S1616. In step S1616, the CPU 102 sets an image at the beginning in the image alignment order as a beginning image of the new image range, and then the processing proceeds to step S1609.

As described above, in the image layout device according to the present exemplary embodiment, it is possible to perform the image selection/layout in which when the layout frames lies over a predetermined section, an order of an image is observed, and when it is in the same section, a coincidence of an attribute is considered more important than the order.

The user may designate whether to select and arrange an image according to an order of an image. More specifically, the CPU 102 presents to the user a screen in which an option about whether to select and arrange an image according to an order of an image is included, and in which an image selection range and a layout frame selection range to which a rule of selecting and arranging an image according to an order of an image is applied can be selected. The CPU 102 may perform processing according to a selection instruction and a selection operation of the image selection range and the layout frame selection range, which are input by the user through the screen.

That is, the CPU 102 determines whether the user has made an instruction to select and arrange an image according to an order of an image. Only when the instruction is given, the CPU 102 selects an image within the selected image selection range in the layout frame and arranges it within the selected layout frame selection range based on the selection operation.

The image selection/layout processing illustrated in FIG. 3 is performed. When the instruction is not given or even when the instruction is selected, for the layout frame and the image within the unselected range, the CPU 102 performs the image selection/layout in sequence based on the priority of the layout frame and the image without considering an order.

Therefore, the user can arbitrarily designate whether to arrange the images according to an order of an image, depending on a template, which is an object in which an image is to be arranged or an image to be arranged.

Further, when an image to be arranged in a selected layout frame is not present, the CPU 102 may arrange by expanding or trimming images ahead of or behind thereof to increase the number of images.

Figure 17:
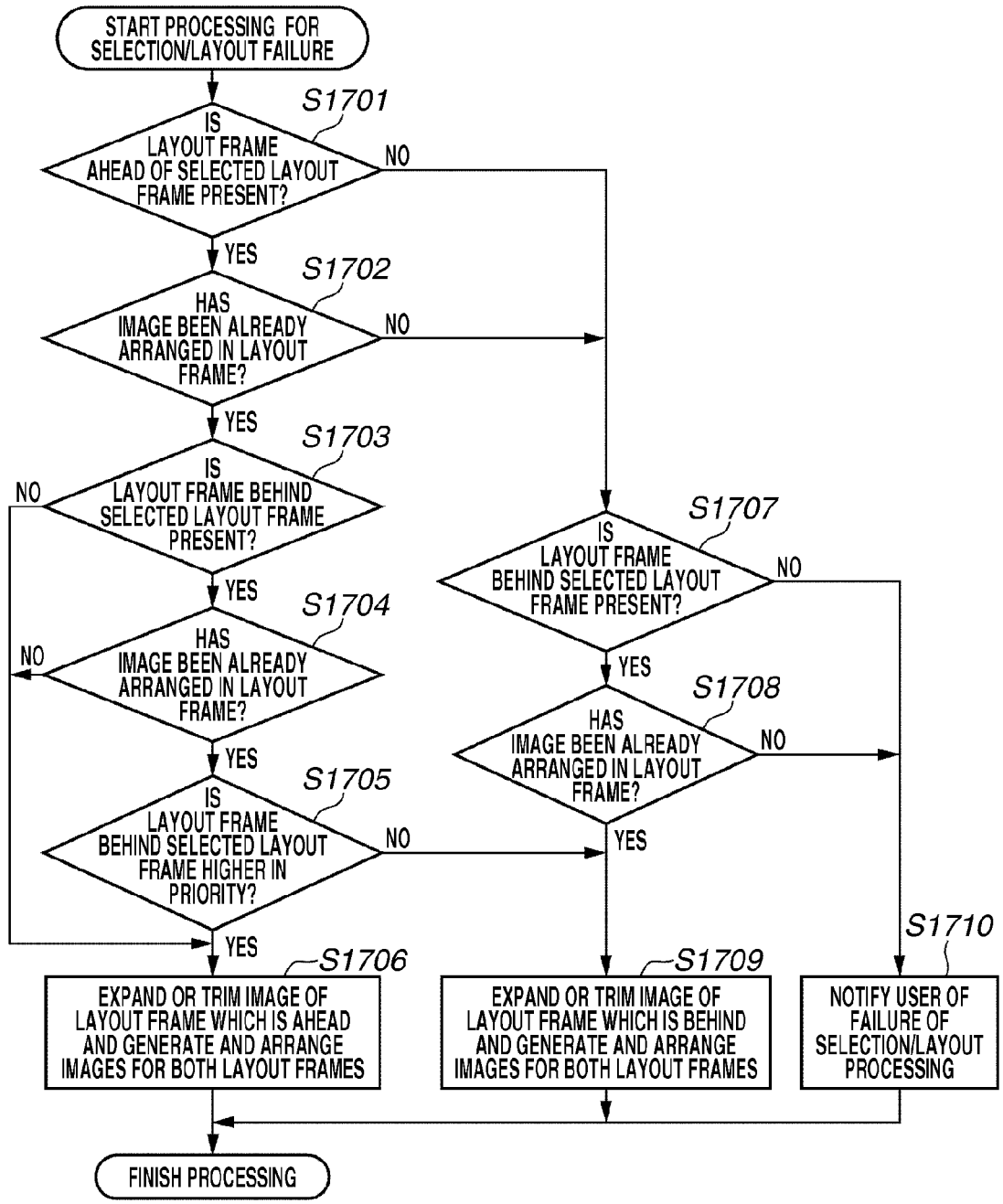
FIG. 17 is a flowchart illustrating an example of processing when it fails to select and arrange a first image.

FIG. 17 is a flowchart illustrating an example of processing when it fails to select and arrange a first image.

First, in step S1701, the CPU 102 determines whether a layout frame ahead of a selected layout frame is present. If the layout frame is present (YES in step S1701), the processing proceeds to step S1702. In step S1702, the CPU 102 determines whether an image has been already arranged in the layout frame. If an image has been already arranged in a layout frame (YES in step S1702), the processing proceeds to step S1703. In step S1703, the CPU 102 determines whether a layout frame behind the selected layout frame is present. If the layout frame is present (YES in step S1703), the processing proceeds to step S1704. In step S1704, the CPU 102 determines whether an image has been already arranged in the layout frame.

If an image has been already arranged in the layout frame (YES in step S1704), the processing proceeds to step S1705. In step S1705, the CPU 102 determines whether a layout frame behind the selected layout frame is higher in priority than a layout frame ahead thereof.

If a layout frame behind the selected layout frame is not present (NO in step S1703) or if an image is not arranged in the layout frame yet (NO in step S1704), the processing proceeds to step S1706. Further, if a layout frame behind the selected layout frame is higher in priority (YES in step S1705), the processing proceeds to step S1706.

In step S1706, the CPU 102 expands or trims an image in the layout frame that is ahead the selected layout frame to generate an image to be arranged in the layout frame that is ahead the selected layout frame and an image to be arranged in the selected layout frame. Then, the CPU 102 finishes the processing illustrated in FIG. 17.

On the other hand, if a layout frame ahead of the selected layout frame is not present (NO in step S1701) or if an image is not arranged in a layout frame ahead of the selected layout frame (NO in step S1702), the processing proceeds to step S1707. In this case, in step S1707, the CPU 102 determines whether a layout frame behind the selected layout frame is present. If the layout frame is present (YES in step S1707), the processing proceeds to step S1708. In step S1708, the CPU 102 determines whether an image has been already arranged in the layout frame.

If an image has been already arranged in the layout frame (YES in step S1708) or if a layout frame that is ahead of the selected layout frame is higher in priority (NO in step S1705), the processing proceeds to step S1709.

In step S1709, the CPU 102 expands or trims an image of the layout frame which is behind the selected layout frame to generate an image to be arranged in the layout frame which is ahead thereof and an image to be arranged in the selected layout frame (image generation) and arrange them. Then, the CPU 102 finishes the processing illustrated in FIG. 17.

However, if a layout frame behind the selected layout frame is not present (NO in step S1707) or if an image is not arranged in the layout frame yet (NO in step S1708), the processing proceeds to step S1710. In step S1710, the CPU 102 notifies the user of a failure of the selection/layout processing and then finishes processing illustrated in FIG. 17.

Therefore, when an image to be arranged in the selected layout frame is not present, it is possible to generate an image to be arranged from an image of a layout frame that is ahead of or behind the selected layout frame.

Further, when an image to be arranged in the selected layout frame is not present, the CPU 102 may change the layout frame to make the layout possible.

Figure 18:
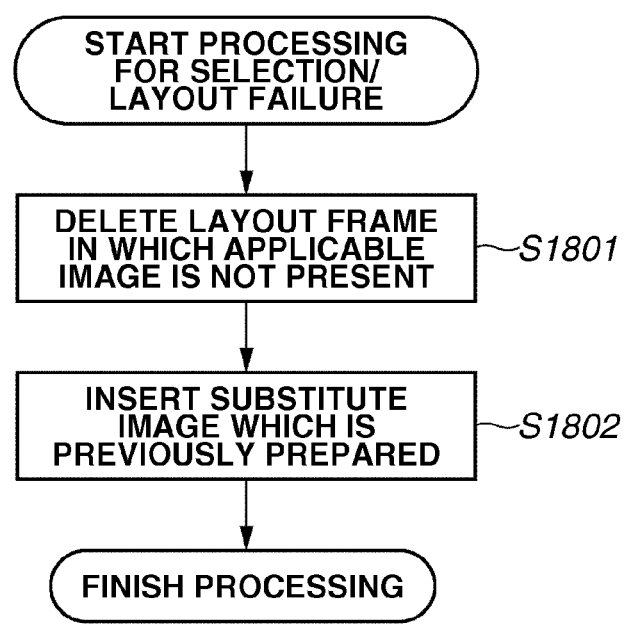
FIG. 18 is a flowchart illustrating an example of processing when it fails to select and arrange a second image.

FIG. 18 is a flowchart illustrating an example of processing when it fails to select and arrange a second image.

First, in step S1801, the CPU 102 deletes a layout frame to which an applicable image is not present. Next, in step S1802, the CPU 102 inserts a substitute image, which is already prepared according to a template, at a position of the deleted layout frame, and then finishes the processing illustrated in FIG. 18. Therefore, when an image to be arranged in the selected layout frame is not present, it is possible to complete the automatic image layout by deleting the layout frame and inserting the substitute image.

Further, an object of the above-described exemplary embodiment may be achieved by the following method. That is, a storage medium (or a record medium) which records a program code of software which implements a function of the above-described exemplary embodiment may be supplied to a system or a device. A central processing unit (a CPU or an MPU) of the system or the device may read and execute the program code stored in the storage medium. In this case, the program code itself read from the storage medium may implement a function of the above-described exemplary embodiment, and the storage medium that records the program code may configure the above-described exemplary embodiment.

Further, the central processing unit of the system or the device may execute the read program code, and thus an operating system (OS) which is operating in the system or the device may execute all or part of actual processing based on an instruction of the program code. A function of the above-described exemplary embodiment may be implemented by the processing.

Further, the program code read from the storage medium may be written in a memory included in a function expansion card inserted into or a function expansion unit connected to the system or the device. Thereafter, a CPU included in the function expansion card or the function expansion unit may execute all or part of actual processing, and a function of the above-described exemplary embodiment may be implemented by the processing.

When the above-described exemplary embodiment is applied to the storage medium, a program code corresponding to the above-described flowchart may be stored in the storage medium.

As described above, according to the exemplary embodiments described above, in a state in which an order of an image is observed, the layout is performed based on a correspondence between an attribute of a layout frame which is an object in which an image is to be arranged and an attribute of an image. Therefore, it is possible to automatically perform the image selection/layout in which the user's intent is reflected.

The exemplary embodiments of the present invention have been described hereinbefore, but the present invention is not limited to a certain exemplary embodiment, and various modifications and changes can be made within the scope and spirit of the present invention as set forth in claims. Further, the exemplary embodiments described above may be arbitrarily combined for implementation.

As described above, according to the present invention, it is possible to automatically perform the image selection/layout in which an order of an image is observed and the user's intent is reflected as much as possible.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-115611 filed May 12, 2009, which is hereby incorporated by reference herein in its entirety.

What is claimed is:

1. An image layout device, comprising:
   an image alignment unit configured to align a plurality of images based on an attribute of each of the plurality of images and to set an image selection range based on the aligned plurality of images;
   a layout frame selection unit configured to select, from a plurality of layout frames, a layout frame that is an arrangement object of an image based on an order of the plurality of layout frames, and on an attribute of each of the plurality of frames;
   an image selection unit configured to select an image from among the images in the image selection range based on a preference degree of each of the plurality of images; and
   a selected image layout unit configured to arrange an image selected by the image selection unit in a layout frame selected by the layout frame selection unit,
   wherein the image selection unit is configured to select an image having a highest preference degree from among the images in the image selection range, set an image selection group ahead of the selected image in the image selection range, determine if the image selection group is empty, and, if the image selection group is not empty, select an image having a highest preference degree from among the images in the image selection group for arrangement by the selected image layout unit in a remaining layout frame selected from the plurality of layout frames by the layout frame selection unit, and
   wherein the image selection unit is configured to select an image having a next highest preference degree from among the images in the image selection range for arrangement by the selected image layout unit in the layout frame already selected by the layout frame selection unit if the image selection group is empty.

2. The image layout device according to claim 1, wherein the layout frame selection unit selects a layout frame based on an order of a layout of a layout frame, within a frame selection range, and on an attribute of a layout frame from among layout frames present within the frame selection range.

3. The image layout device according to claim 2, wherein the layout frame selection unit sets layout frames from a layout frame at a beginning to a layout frame at an end as an initial value of the frame selection range based on a layout of a layout frame, and excludes a layout frame from the frame selection range when an image is arranged in the layout frame by the selected image layout unit.

4. The image layout device according to claim 2, wherein the layout frame selection unit sets layout frames from a layout frame at a beginning to a layout frame at an end as an initial value of the frame selection range based on a layout of a layout frame, and, when an image is arranged in a layout frame by the selected image layout unit, sets a layout frame group ahead of the layout frame in an order or a layout frame group behind the layout frame in an order as the frame selection range.

5. The image layout device according to claim 1, wherein the image selection unit sets images from an image at a beginning to an image at an end as an initial value of the image selection range based on an order of an image aligned by the image alignment unit, and, when an image is arranged in a layout frame by the selected image layout unit, excludes the image from the image selection range.

6. The image layout device according to claim 1,
   wherein the image selection unit notifies an error when it is determined based on an order of an image aligned by the image alignment unit and the attribute of the image that an image to be selected is not present in the image selection range, and
   wherein the image layout device further includes an image generating unit configured to determine whether an image is arranged in a layout frame ahead of or behind a layout frame selected by the layout frame selection unit when a notification of the error is received, and, when an image is arranged in the layout frame which is ahead of or behind the selected layout frame, generate an image to be arranged in the layout frame selected by the layout frame selection unit based on the image.

7. The image layout device according to claim 1,
   wherein the image selection unit notifies an error when it is determined based on an order of an image aligned by the image alignment unit and the attribute of the image that an image to be selected is not present in the image selection range, and
   wherein the image layout device further comprises a presentation unit configured to present the error to a user when a notification of the error is received and present, to the user, an option about whether to perform a layout regardless of an order of an image.

8. The image layout device according to claim 1, further comprising:
- a determination unit configured to determine whether an attribute is an attribute relating to an order based on an attribute of an image included in the plurality of images; and
- an image selection/layout unit configured to perform image selection and layout processing, which is not based on an order of an image, when the determination unit determines that the attribute is not an attribute relating to an order,
- wherein the image alignment unit aligns an image included in an image group based on an attribute of an image included in an image group when the determination unit determines that the attribute is an attribute relating to an order.

9. The image layout device according to claim 1, further comprising:
- a determination unit configured to determine whether an attribute is an attribute relating to an order based on an attribute of the layout frame that is an arrangement object of an image; and
- an image selection/layout unit configured to perform image selection and layout processing, which is not based on an order of an image, when the determination unit determines that the attribute is not an attribute relating to an order,
- wherein the image alignment unit aligns an image included in an image group based on an attribute of an image included in an image group when the determination unit determines that the attribute is an attribute relating to an order.

10. The image layout device according to claim 1,
- wherein the layout frame selection unit sets a frame selection range based on a user's selection operation, and
- wherein the image selection unit sets an image selection range based on a user's selection operation.

11. The image layout device according to claim 1, further comprising:
- a determination unit configured to determine whether a layout frame, in which an image is arranged and which is an arrangement object of an image, is in the same page as a current layout frame,
- wherein the image selection unit selects an image based on the preference degree of the image when the determination unit determines that the layout frame is in the same page as a current layout frame, and selects an image based on an order of the image aligned by the image alignment unit, and on the preference degree of the image when the determination unit determines that the layout frame is not in the same page as the current layout frame.

12. An image layout method comprising:
- aligning, by a processor, a plurality of images based on an attribute of each of the plurality of images;
- setting an image selection range based on the aligned plurality of images;
- selecting from a plurality of layout frames a layout frame that is an arrangement object of an image based on an order of the plurality of layout frames, and on an attribute of each of the plurality of layout frames;
- selecting an image having a highest preference degree from among the images in the image selection range;
- arranging the selected image in the selected layout frame;
- setting an image selection group ahead of the selected image in the image selection range;
- determining if the image selection group is empty;
- selecting an image having a highest preference degree from among the images in the image selection group for arrangement in a remaining layout frame selected from the plurality of layout frames if the image selection group is not empty;
- selecting an image having a next highest preference degree from among the images in the image selection range if the image selection group is empty; and
- arranging the selected image in the already selected layout frame.

13. A non-transitory computer-readable storage medium storing a program for causing a computer to execute a method comprising:
- aligning a plurality of images based on an attribute of each of the plurality of images;
- setting an image selection range based on the aligned plurality of images;
- selecting, from a plurality of layout frames, a layout frame that is an arrangement object of an image based on an order of the plurality of layout frames and on an attribute of each of the plurality of layout frames;
- selecting an image having a highest preference degree from among the images in the image selection range;
- arranging the selected image in the selected layout frame;
- setting an image selection group ahead of the selected image in the image selection range;
- determining if the image selection group is empty;
- selecting an image having a highest preference degree from among the images in the image selection group for arrangement in a remaining layout frame selected from the plurality of layout frames if the image selection group is not empty;
- selecting an image having a next highest preference degree from among the images in the image selection range if the image selection group is empty; and
- arranging the selected image in the already selected layout frame.

* * * * *